(12) United States Patent
Suzuki

(10) Patent No.: US 10,215,889 B2
(45) Date of Patent: Feb. 26, 2019

(54) LENS UNIT, LENS UNIT HOLDER, PRINT HEAD, IMAGE SENSOR HEAD, IMAGE FORMING APPARATUS, IMAGE SCANNER APPARATUS

(71) Applicant: Oki Data Corporation, Tokyo (JP)

(72) Inventor: Takahito Suzuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/654,321

(22) Filed: Jul. 19, 2017

(65) Prior Publication Data

US 2018/0031741 A1 Feb. 1, 2018

(30) Foreign Application Priority Data

Jul. 29, 2016 (JP) .................. 2016-149975

(51) Int. Cl.
*G02B 7/02* (2006.01)
*G01B 3/00* (2006.01)
(Continued)

(52) U.S. Cl.
CPC .......... *G02B 3/0075* (2013.01); *G02B 3/005* (2013.01); *G02B 7/008* (2013.01); *G02B 7/021* (2013.01);
(Continued)

(58) Field of Classification Search
CPC .......... G02B 7/02; G02B 7/021; G02B 7/022; G02B 7/025; G02B 7/028; G02B 7/008; G02B 3/0012; G02B 3/0025; G02B 3/005; G02B 3/0062; G02B 3/0068; G02B 3/0056; G02B 3/0075; G02B 3/0006; G02B 13/24; G02B 13/26; H01L 27/15; H01L 25/0753; B41J 2/442; B41J 2/45; B41J 2/451; B41J 2/455; B41J 2/46; B41J 2/465; B41J 2/47; B41J 19/20
USPC ....... 359/435, 619–622, 626, 740, 811, 819; 355/55, 56, 62, 63, 67, 68; 347/130, 224, 347/225, 241, 242, 244, 245, 257, 258, 347/263; 362/268, 555, 607, 611, 612, (Continued)

(56) References Cited

U.S. PATENT DOCUMENTS 5,444,520 A * 8/1995 Murano .................. B41J 2/465
347/244
7,706,070 B2 * 4/2010 Yamamura ............... B41J 2/451
359/618
(Continued)

FOREIGN PATENT DOCUMENTS

JP    2013-015847 A    1/2013

*Primary Examiner* — Loha Ben
(74) *Attorney, Agent, or Firm* — Metrolexis Law Group, PLLC

(57) ABSTRACT

A lens unit according to an embodiment includes: lens members in each of which lenses are linearly arrayed in a longitudinal direction; at least one light block member between the lens members; engagement sections arranged in the longitudinal direction, each of the engagement sections configured to mutually engage members including the lens members and the light block member and stacked with each other; and clamp members disposed in positions corresponding to at least one of the engagement sections in the longitudinal direction and configured to clamp the stacked members. All the stacked members are fixed with each other at only one portion in the longitudinal direction.

17 Claims, 29 Drawing Sheets

(51) Int. Cl.
    *G02B 3/00*    (2006.01)
    *G02B 7/00*    (2006.01)
    *G02B 13/24*    (2006.01)
(52) U.S. Cl.
    CPC .............. *G02B 7/028* (2013.01); *G02B 7/022* (2013.01); *G02B 13/24* (2013.01)
(58) Field of Classification Search
    USPC ........... 362/617; 257/241, 243, 758, E25.02, 257/E27.12
    See application file for complete search history.

(56) References Cited

U.S. PATENT DOCUMENTS

| | | | | |
|---|---|---|---|---|
| 7,933,070 B2* | 4/2011 | Yamamura | ............ | G03G 15/326 359/621 |
| 8,194,112 B2* | 6/2012 | Sowa | ................ | B41J 2/451 347/238 |
| 8,253,767 B2* | 8/2012 | Ito | ..................... | B41J 2/451 347/238 |
| 8,274,742 B2* | 9/2012 | Yamamura | ............ | G03G 15/326 359/621 |
| 8,310,762 B2* | 11/2012 | Yamamura | ............ | G02B 3/0056 359/455 |
| 8,670,016 B2* | 3/2014 | Suto | ................. | B41J 2/451 347/242 |
| 8,780,417 B2* | 7/2014 | Yamamura | ............... | H04N 1/10 358/474 |
| 8,922,894 B2* | 12/2014 | Yamamura | ............... | F21K 9/50 355/67 |
| 10,009,501 B2* | 6/2018 | Suzuki | ............... | H04N 1/02845 |

* cited by examiner

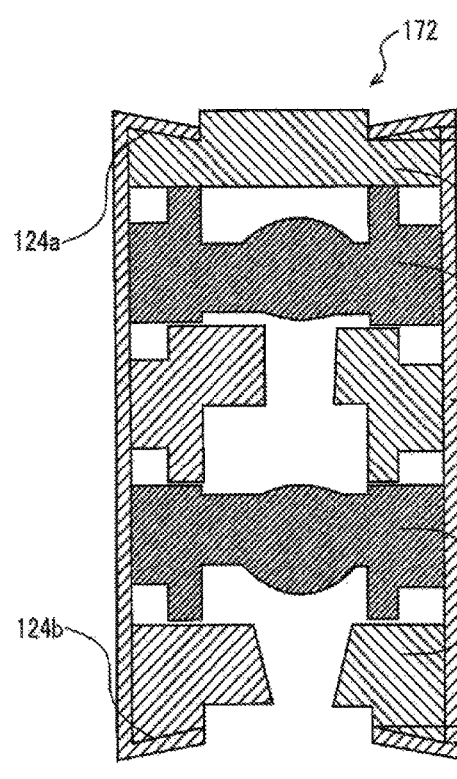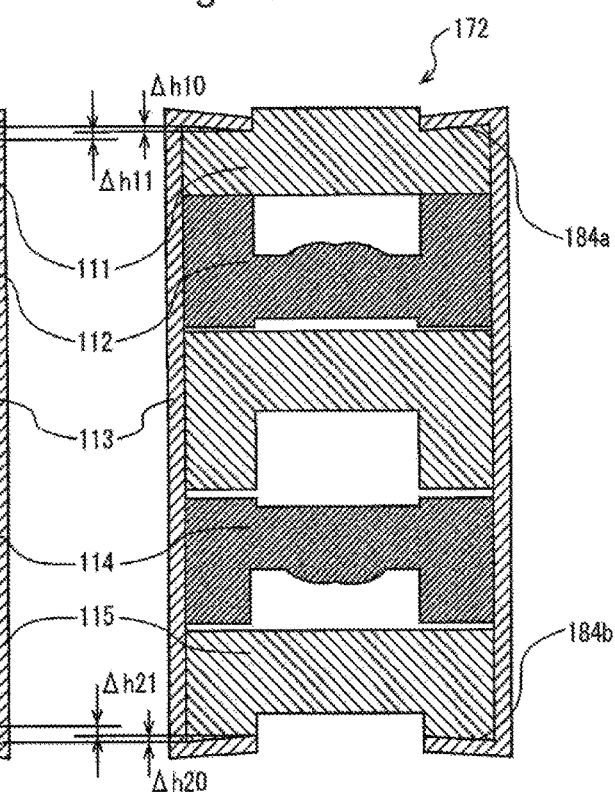

LENS UNIT, LENS UNIT HOLDER, PRINT HEAD, IMAGE SENSOR HEAD, IMAGE FORMING APPARATUS, IMAGE SCANNER APPARATUS

CROSS REFERENCE TO RELATED APPLICATIONS

This application claims priority based on 35 USC 119 from prior Japanese Patent Application No. 2016-149975 filed on Jul. 29, 2016, entitled "LENS UNIT, LENS UNIT HOLDER, PRINT HEAD, IMAGE SENSOR HEAD, IMAGE FORMING APPARATUS, IMAGE SCANNER APPARATUS", the entire contents of which are incorporated herein by reference.

BACKGROUND

1. Field

The present disclosure relates to a lens unit, a lens unit holder, a print head, an image sensor head, an image forming apparatus, and an image scanner apparatus.

2. Description of the Related Art

In a lens unit of related art, a first lens array manufactured by injection molding and a second lens array manufactured by injection molding using the same mold are disposed such that the second lens array is turned around an axis set in a longitudinal direction of a light block member, and has optical axes alighted with optical axes of the first lens array. The first and second lens arrays and the light block member are stacked such that the light block member is held between the lens arrays. This structure absorbs relative displacement and a shape difference due to contraction and expansion of materials (see, for example, Japanese Patent Application Publication No. 2013-15847).

SUMMARY

However, in the structure explained above, if the components constituting the lens unit are different in linear expansion due to heat and water absorption, the entire lens unit may warp in the lens optical axis direction.

An object of an embodiment is to suppress the warp in the lens optical axis direction.

An aspect of the invention is a lens unit that includes: lens members in each of which lenses are linearly arrayed in a longitudinal direction; at least one light block member between the lens members; engagement sections arranged in the longitudinal direction, each of the engagement sections configured to mutually engage members including the lens members and the light block member and stacked with each other to align with optical axes of the lenses; and clamp members disposed in positions corresponding to at least one of the engagement sections in the longitudinal direction and configured to clamp the stacked members. All the stacked members are fixed with each other at only one portion in the longitudinal direction.

According to the aspect of the invention, it is possible to suppress the warp in the lens optical axis direction.

BRIEF DESCRIPTION OF THE DRAWINGS

FIGS. 20A and 20B are explanatory diagrams of a clamp state of the lens unit in the modification 2;

DETAILED DESCRIPTION OF EMBODIMENTS

Figure 1A:
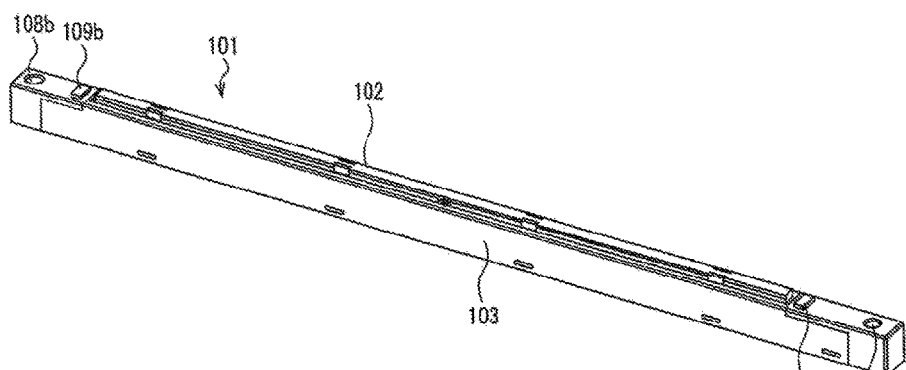
FIGS. 1A to 1D are explanatory diagrams of a print head in a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

One or more embodiments of a lens unit, a lens unit holder, a print head, an image sensor head, an image forming apparatus, and an image scanner apparatus are explained below with reference to the drawings.

First Embodiment

First, a print head included in a printer functioning as an image forming apparatus is explained. Note that the configuration of the printer is explained later.

Figure 1B:
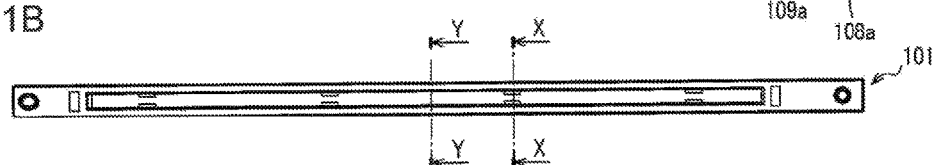
Figure 1C:
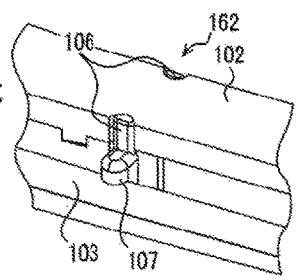
Figure 1D:
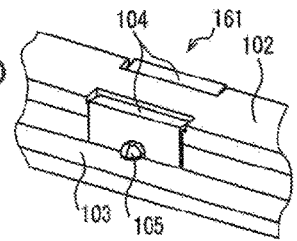
Figure 2:
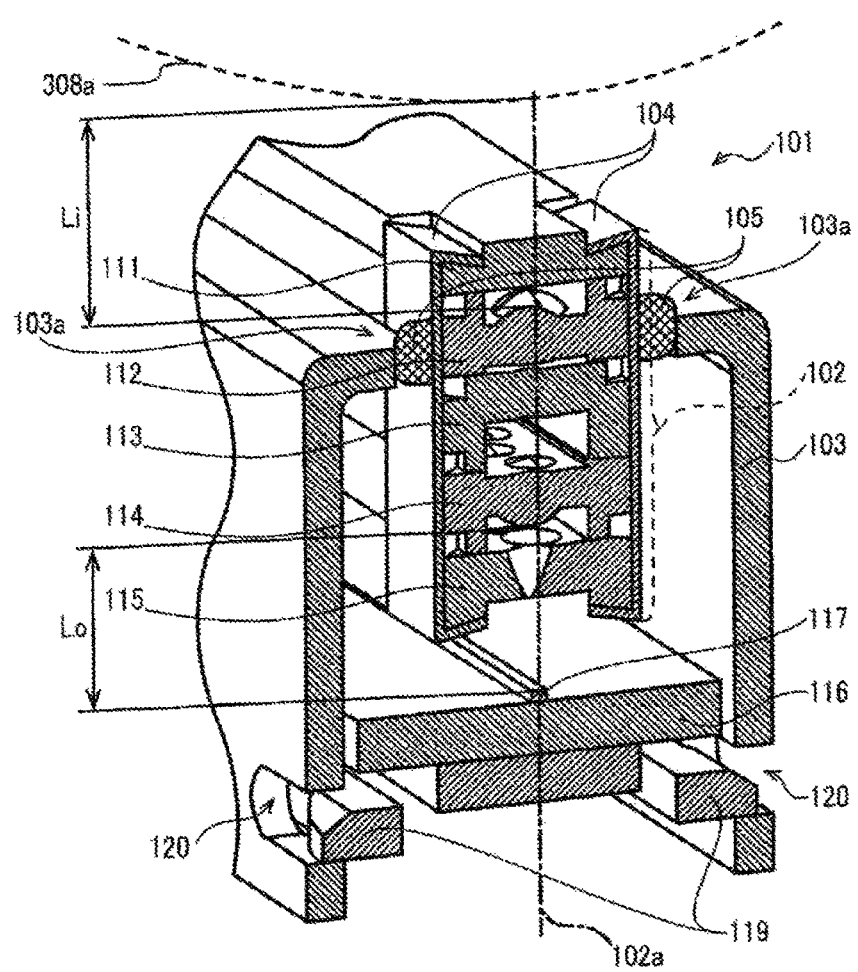
FIG. 2 is a sectional view of the print head.
Figure 3A:
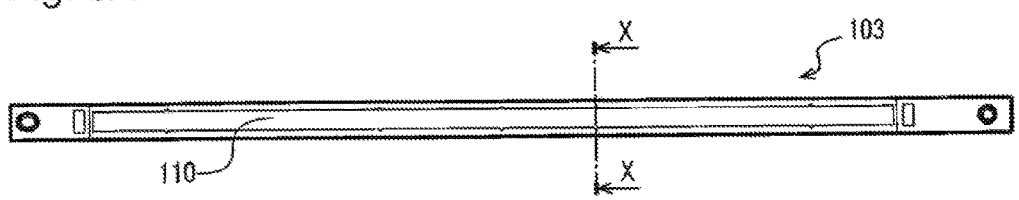
FIGS. 3A and 3B are explanatory diagrams of a holder of the print head.
Figure 3B:
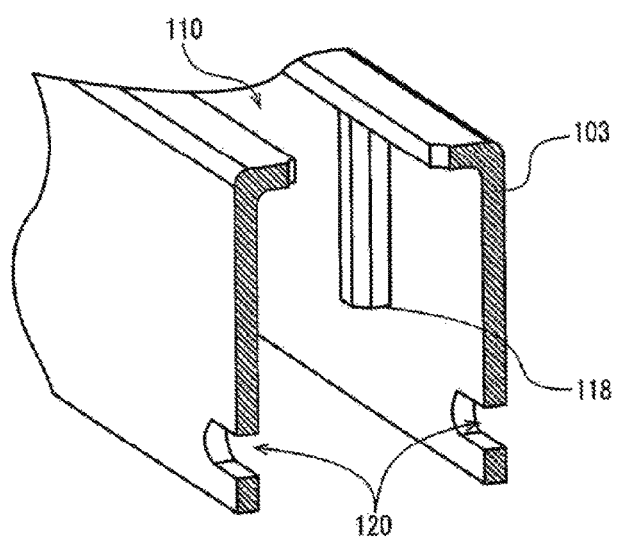
Figure 4:
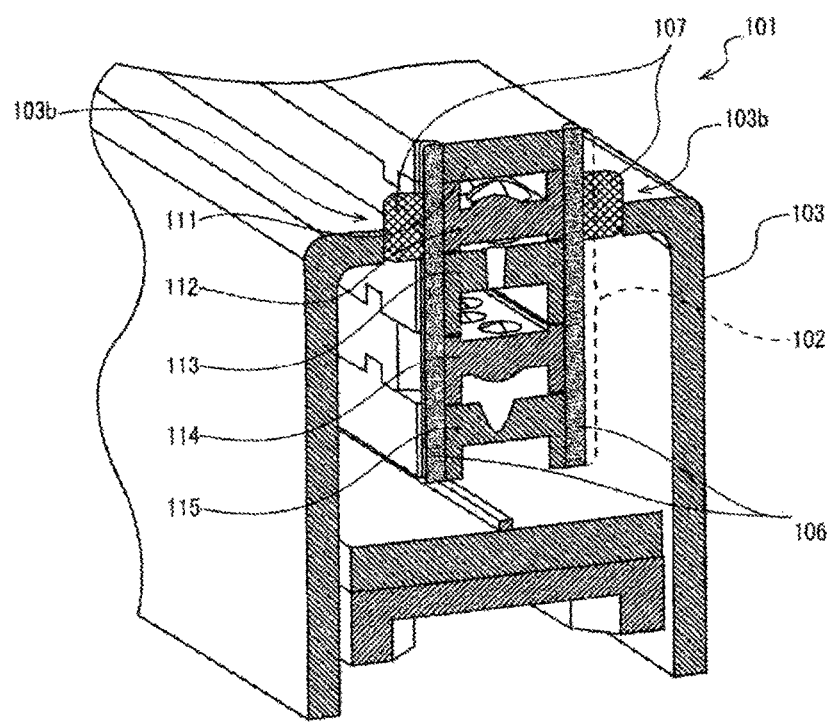
FIG. 4 is a sectional view of the print head.

FIGS. 1A to 1D are explanatory diagrams of a print head in a first embodiment. FIG. 1A is a perspective view of the print head. FIG. 1B is a plan view of the print head. FIG. 1C is an enlarged view of an attachment part of a lens unit to a holder, which is provided in a longitudinal center portion of the print head. FIG. 1D is an enlarged view of one of attachment parts of the lens unit to the holder, which are provided at positions other than the longitudinal center portion of the print head. FIG. 2 is a sectional view of the print head and is an X-X arrow view in FIGS. 1A to 1D. FIGS. 3A and 3B are explanatory diagrams of the holder of the print head. FIG. 3A is a plan view of the holder. FIG. 3B is an X-X arrow view in FIG. 3A. FIG. 4 is a sectional view of the print head and is a Y-Y arrow sectional view in FIG. 1.

Print head 101 in this embodiment is explained with reference to FIGS. 1A to 4.

In FIGS. 1A to 1D, FIG. 2, and FIG. 4, in order to clearly explain an attachment structure of lens unit 102 and lens unit holder (hereinafter referred to as "holder") 103, a structure is illustrated in which a silicone sealing material is omitted between lens unit 102 and holder 103. However, in order to prevent foreign matters from intruding into the inside of print head 101 from a gap section formed between lens unit 102 and holder 103, the silicone sealing material may be disposed between lens unit 102 and holder 103.

As illustrated in FIG. 1, in print head 101, lens unit 102 is fixed (attached) to holder 103 using adhesives 105 and 107. Lens unit 102 includes lens cover 111, first lens array 112, partition wall light block plate 113, second lens array 114, and incident light block plate 115.

As illustrated in FIG. 2, at attachment parts 161 of lens unit 102 to holder 103 at positions other than the longitudinal center portion of print head 101 illustrated in FIG. 1D, members of lens unit 102, which are lens cover 111, first lens array 112, partition wall light block plate 113, second lens array 114, and incident light block plate 115, are stacked in the direction of optical axis 102a of semiconductor light emitting element 117, and the stacked members 111, 112, 113, 114, and 115 are champed together by clamp members 104 provided at both widthwise sides of lens unit 102, and lens unit 102 is attached to holder 103 via clamp members 104. Note that the widthwise direction of the lens unit 102 is orthogonal to the stacking direction of the members and orthogonal to the longitudinal direction of lens unit 102.

Plural pairs of clamp members 104 are disposed in the longitudinal direction of lens unit 102, and each pair of clamp members 104 clamp all the stacked members from both widthwise sides of the lens unit 102. Lens unit 102 is fixed (attached) to holder 103 with adhesive 105 filled in first filling section 103a provided between clamp members 104 and holder 103.

Figure 10:
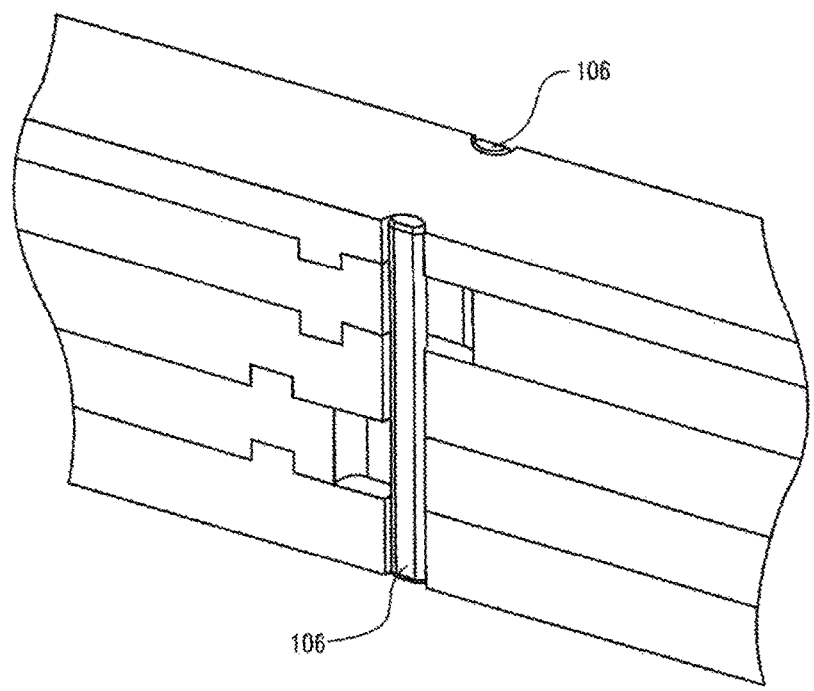
FIG. 10 is an explanatory diagram of a bonding structure of the lens unit.

On the other hand, as illustrated in FIG. 4, at attachment part 162 of lens unit 102 to holder 103 at the longitudinal center portion of print head 101 illustrated in FIG. 10, all the stacked members (lens cover 111, first lens array 112, partition wall light block plate 113, second lens array 114, and incident light block plate 115) of lens unit 102a re bonded (fixed) one another with adhesive 106 filled on both widthwise sides of lens unit 102. Further, at the attachment part of lens unit 102 to holder 103 at the longitudinal center portion of print head 101, adhesive 107 is filled in second filling section 103b (see, FIG. 4) between the bonding part of lens unit 102 and lens holder 103 such that adhesive 107 is in direct contact with at least one of the stacked members (lens cover 111, first lens array 112, partition wall light block plate 113, second lens array 114, and incident light block plate 115) of lens unit 102, thereby lens unit 102 is fixed (attached) to lens holder 103 via adhesive 107 at the longitudinal center portion of print head 101.

That is, in this embodiment, in attachment part 162 at the longitudinal center portion, the stacked members(lens cover 111, first lens array 112, partition wall light block plate 113, second lens array 114, and incident light block plate 115) of lens unit 102 are bonded to one another with adhesive 106 filled in both widthwise sides of lens unit 102.

In this way, all the stacked members are fixed (bonded) together by the adhesive at attachment part 162 at the longitudinal center portion of lens unit 102 (the attachment part in which clamp members 104 are not disposed). Further, lens unit 102 is fixed (attached) to holder 103 at attachment part 162 at the longitudinal center portion of lens unit 102.

Note that, as illustrated in FIGS. 1A and 1B, round hole 108a and long hole 108b are provided at both longitudinal end portions of print head 101, which are to be fit with protrusions provided at a printer body to position print head 101 with respect to the printer body.

Contact sections 109a and 109b are provided near both longitudinal end portions of print head 101. Contact sections 109a and 109b are to be in contact with contact sections of the printer body to be positioned such that distance Li between latent image surface 308a of a photosensitive drum and an upper surface extreme point of first lens array 112 in the direction of lens optical axis 102a illustrated in FIG. 2 is a designed optical distance.

Note that, an eccentric cam mechanism may be provided in contact sections 109a and 109b, to adjust distance Li to be the optical designed distance.

As illustrated in FIGS. 3A and 3B, lens unit 102 is fixed to holder 103 by bonding adhesive 105 to holder 103 via clamp members 104 in slit section 110 on the upper surface of holder 103.

As illustrated in FIG. 2, the attachment height of lens unit 102 with respect to holder 103 is adjusted such that distance Lo between the surfaces of semiconductor light emitting elements 117 linearly arrayed in the longitudinal direction on printed wiring board 116 and a lower surface extreme point of second lens array 114 in lens unit 102 is a designed optical distance.

Next, lens unit 102 is explained. Lens unit 102 includes lens cover 111, first lens array 112, partition wall light block plate 113, second lens array 114, and incident light block plate 115 stacked in this order from latent image surface 308a side of the photosensitive drum. Lens cover 111 protects lens unit 102.

First lens array 112 and second lens array 114 functioning as lens members are tabular lens arrays in which micro-lenses are linearly arrayed in the longitudinal direction. First lens array 112 and second lens array 114 are disposed such that optical axes of the micro-lenses are aligned. First lens array 112 and second lens array 114 form an image of semiconductor light emitting elements 117 as an erected non-magnification image on latent image surface 308a of the photosensitive drum according to a combination of the micro-lenses.

Partition wall light block plate 113 functioning as a light block member is disposed between first lens array 112 and second lens array 114. Partition wall light block plate 113 is a tabular plate in which an opening section functioning as a diaphragm is formed be aligned with the optical axes of the micro-lenses. Partition wall light block plate 113 blocks a stray light component in a ray emitted from second lens array 114 in the direction of first lens array 112 and secures a clearance (an interval) between first lens array 112 and second lens array 114.

Incident light block plate 115 blocks a stray light component made incident on second lens array 114 from semiconductor light emitting elements 117.

Members of lens cover 111, first lens array 112, partition wall light block plate 113, second lens array 114, and incident light block plate 115 are engaged with one another by being clamped with clamp members 104.

Printed wiring board 116 mounted with semiconductor light emitting elements 117 is positioned by setting board contact section 118 illustrated in FIG. 3B and the surface of printed wiring board 116 in contact with each other such that distance Lo between the surface of semiconductor light emitting elements 117 and the lower surface extreme point of second lens array 114 in lens unit 102 is the designed optical distance.

Printed wiring board 116 is held and fixed to board contact section 118 provided on holder 103 side by engaging base clamp member 119 illustrated in FIG. 2 in clamp hole 120 provided on a side surface of holder 103.

At the longitudinal center portion of lens unit 102, as illustrated in FIG. 4, at least one of adhesive 106 and the stacked members (111 to 115) of lens unit 102 are directly fixed (attached) to holder 103 by adhesive 107.

As explained above, lens unit 102 in this embodiment is configured by stacking the plate members of lens cover 111, first lens array 112, partition wall light block plate 113, second lens array 114, and incident light block plate 115. Note that, in this embodiment, one partition wall light block plate 113 is disposed between first lens array 112 and second lens array 114. However, two or more plate members such as light block members may be disposed.

A stacked configuration of lens unit 102 is explained with reference to FIGS. 5 to 13.

Figure 5:
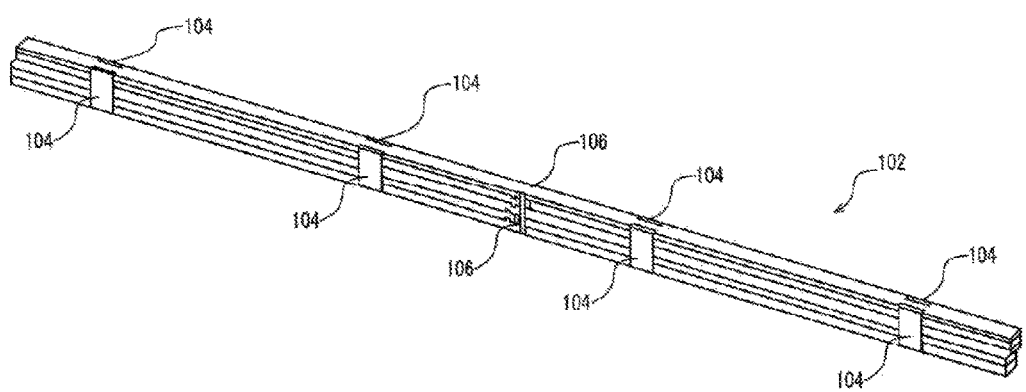
FIG. 5 is a perspective view of a lens unit of the print head.

First, FIG. 5 is a perspective view of the lens unit. At the longitudinal center portion of lens unit 102 illustrated in FIG. 5, the stacked members of lens unit 102 are fixed (bonded) to one another by adhesive 106. At positions other than the longitudinal center portion of lens unit 102, the stacked members of lens unit 102 are clamped by clamp members 104 in the stacked state.

Figure 6:
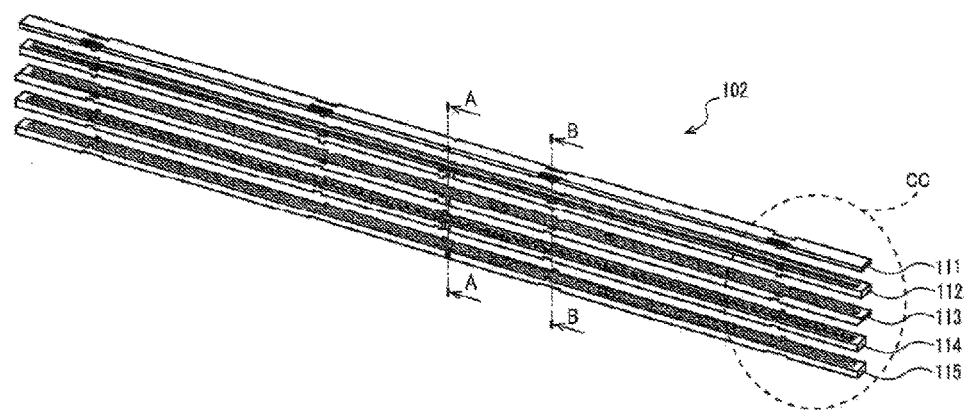
FIG. 6 is an explanatory diagram for explaining a stack structure of the lens unit.
Figure 7:
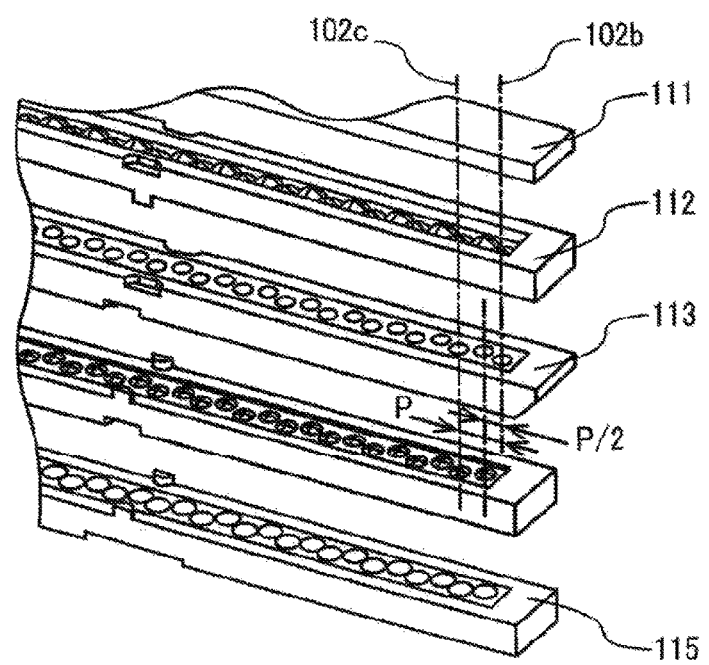
FIG. 7 is an enlarged view for explaining the stack structure of the lens unit.

FIG. 6 is an explanatory diagram of a stack structure of the lens unit. FIG. 7 is an enlarged view of the stack structure of the lens unit (an enlarged view of the region CC in FIG. 6). FIG. 7 illustrates a state before the members of lens unit 102 are stacked.

In FIGS. 6 and 7, lens unit 102 includes, from the upper side toward the lower side, lens cover 111, first lens array 112, partition wall light block plate 113, second lens array 114, and incident light block plate 115 as members of lens unit 102.

First lens array 112 and second lens array 114 are desirably injection-molded using the same mold. First lens array 112 and second lens array 114 are disposed to be rotation-symmetrical to each other with the longitudinal direction of partition wall light block plate 113 as a rotation axis. First lens array 112 and second lens array 114 are shifted in the longitudinal direction by a half cycle (P/2) of lens pitch P to align the optical axes of the lenses. Note that, in first lens array 112 and second lens array 114, multiple micro-lenses are arrayed in a zigzag in two rows in the longitudinal direction. An interval between the optical axes of the micro-lenses in the same row (e.g., optical axis 102b and optical axis 102c) is arrayed as lens pitch P in the longitudinal direction.

First lens array 112 and second lens array 114 are stacked in this way because, when first lens array 112 and second lens array 114 are manufactured by injection molding, it is possible to suppress deviation of the lens optical axes of first lens array 112 and second lens array 114 as much as possible by adjusting molding accuracy of a mold and the direction of a resin flow.

With such a stack structure of first lens array 112 and second lens array 114, in the stack structure of lens unit 102 illustrated in FIGS. 6 and 7, lens cover 111, first lens array 112, partition wall light block plate 113, second lens array 114, and incident light block plate 115 are shifted in the longitudinal direction by the half cycle (P/2) of lens pitch P and stacked.

Figure 8:
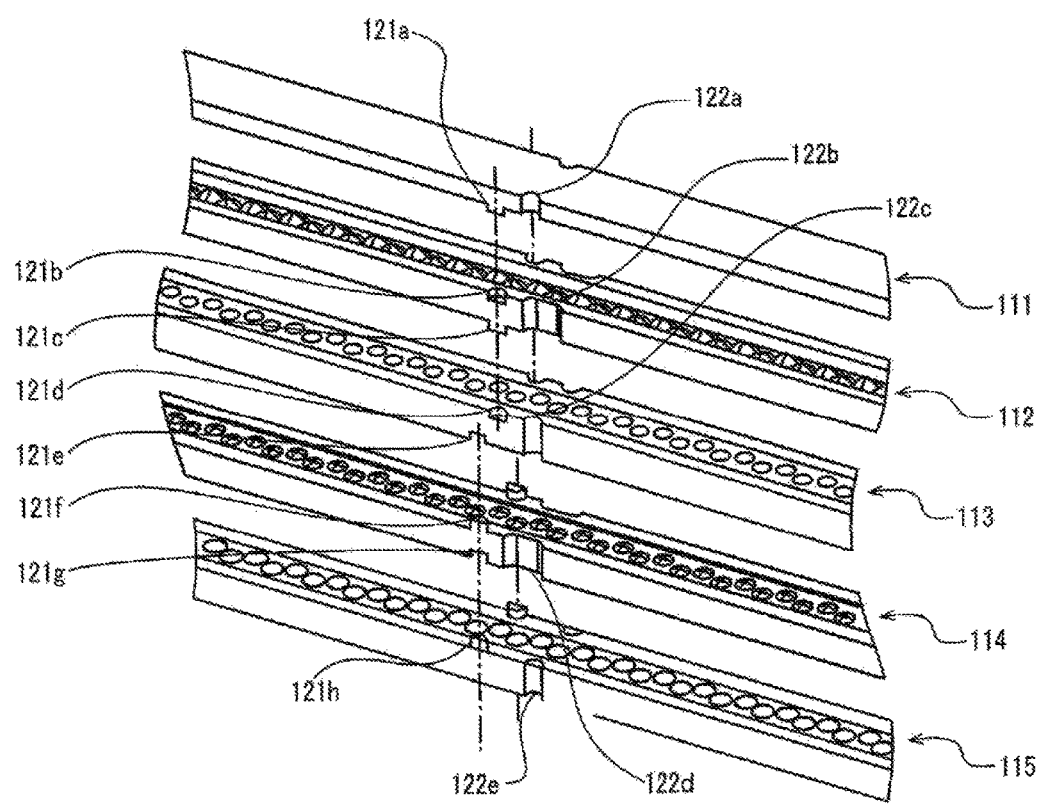
FIG. 8 is an enlarged view for explaining the stack structure of the lens unit.
Figure 9:
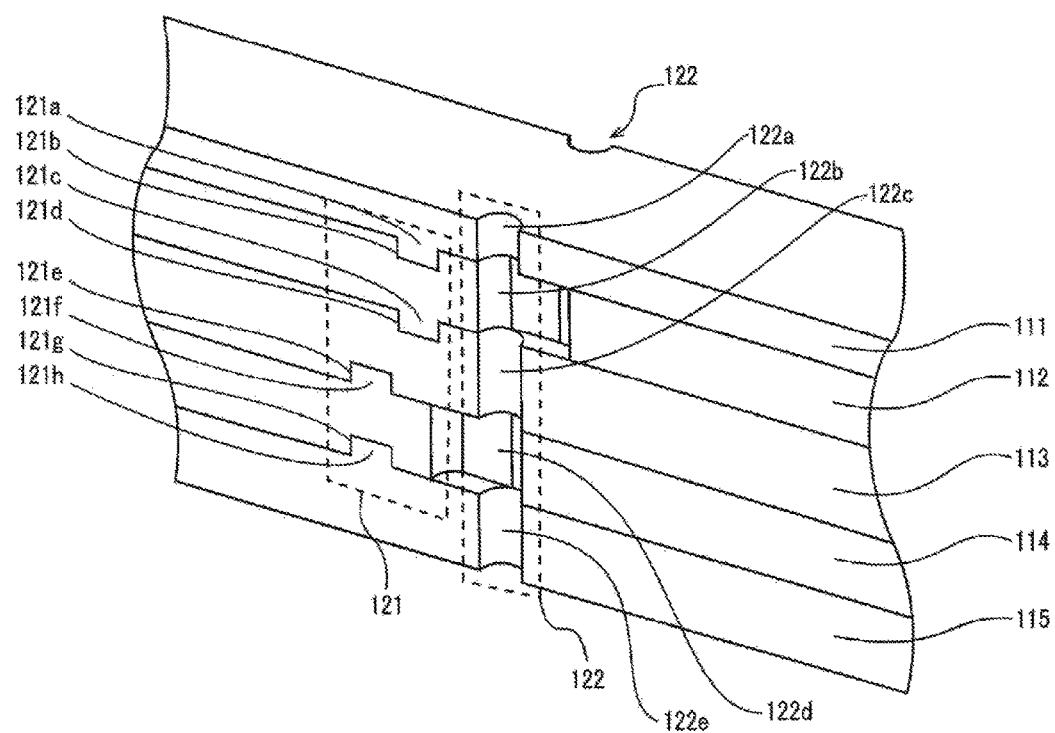
FIG. 9 is an enlarged view of a stacked state of the lens unit.

FIG. 8 is an enlarged view of the stack structure of the lens unit and is an enlarged view of region AA in the longitudinal center portion of lens unit 102 illustrated in FIG. 6. FIG. 9 is an enlarged view of a stacked state of the lens unit in the first embodiment and is a view illustrating a state in which the members of the lens unit illustrated in FIG. 8 are stacked. FIG. 10 is an explanatory diagram of a bonding structure (a fixation structure) of the lens unit.

As shown in FIGS. 8 and 9, an engagement section at or in vicinity of the longitudinal center portion of lens unit 102 illustrated in FIG. 6 includes protrusions 121a, 121c, 121f, and 121h functioning as engagement parts and recesses 121b, 121d, 121e, and 121g functioning as engagement parts for positioning each of the members with respect to the other members in the longitudinal direction, the widthwise direction, and the optical axis height direction, for example, by restricting movements or misalignments of each of the members with respect to adjacent members in the longitudinal direction, the widthwise direction, and the optical axis height direction. The protrusions 121a, 121c, 121f, and 121h and recesses 121b, 121d, 121e, and 121g are formed in ribs provided at the outer circumferential edge portion of lens cover 111 and the outer circumferential edge portions of regions where the lens arrays are disposed in first lens array 112 and second lens array 114 and in ribs provided at the outer circumferential edge portions of aperture regions where diaphragms are disposed in partition wall light block plate 113 and incident light block plate 115.

When protrusions 121a, 121c, 121f, and 121h and recesses 121b, 121d, 121e, and 121g are respectively fit with each other as illustrated in FIG. 9, the members are engaged with one another and can be highly accurately positioned in the longitudinal direction, the widthwise direction, and the optical axis height direction such that, for example, maximum tolerance is approximately 10 μm.

On side surfaces of the ribs of lens cover 111, first lens array 112, partition wall light block plate 113, second lens array 114, and incident light block plate 115, recesses 122a, 122b, 122c, 122d, and 122e, which extend in the stacking direction on the side surfaces of the members and in which adhesive 106 is filled, are formed such that the members can be bonded and fixed by adhesive 106 illustrated in FIG. 10 after the members are stacked.

Since first lens array 112 and second lens array 114 are injection-molded using the same mold, recess 122b formed in first lens array 112 and recess 122d formed in second lens array 114 are formed to be wider than other recesses 122a, 122c, and 122e by the half cycle (P/2) of lens pitch P in the longitudinal direction in order to linearly form recesses 122 in the stacking direction when first lens array 112 and second lens array 114 are shifted from each other in the longitudinal direction by the half cycle (P/2) of lens pitch P and stacked.

Figure 11:
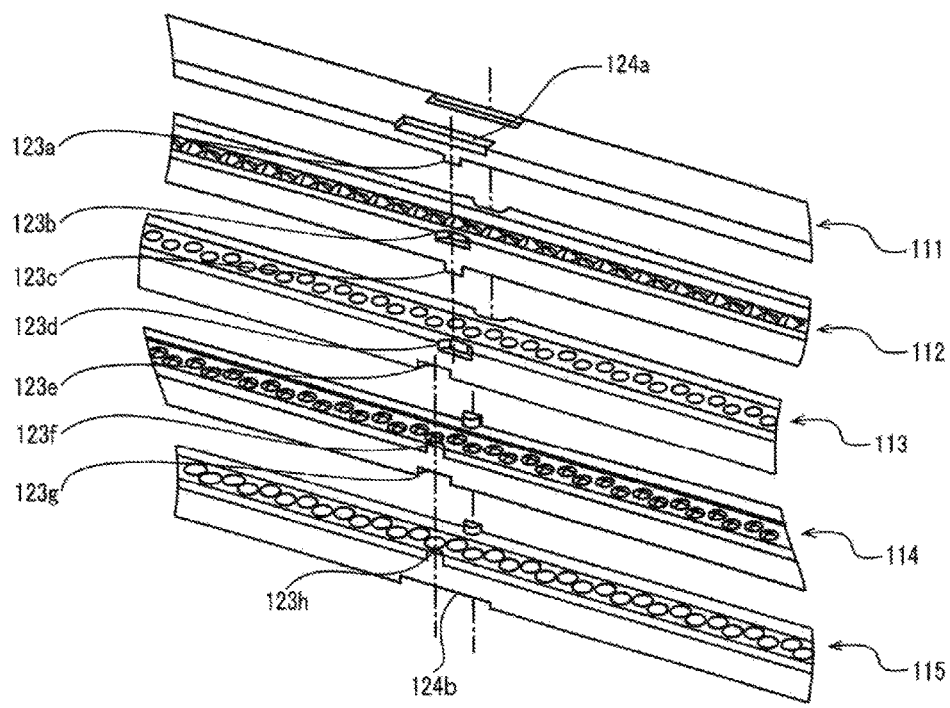
FIG. 11 is an enlarged view for explaining the stack structure of the lens unit.
Figure 12:
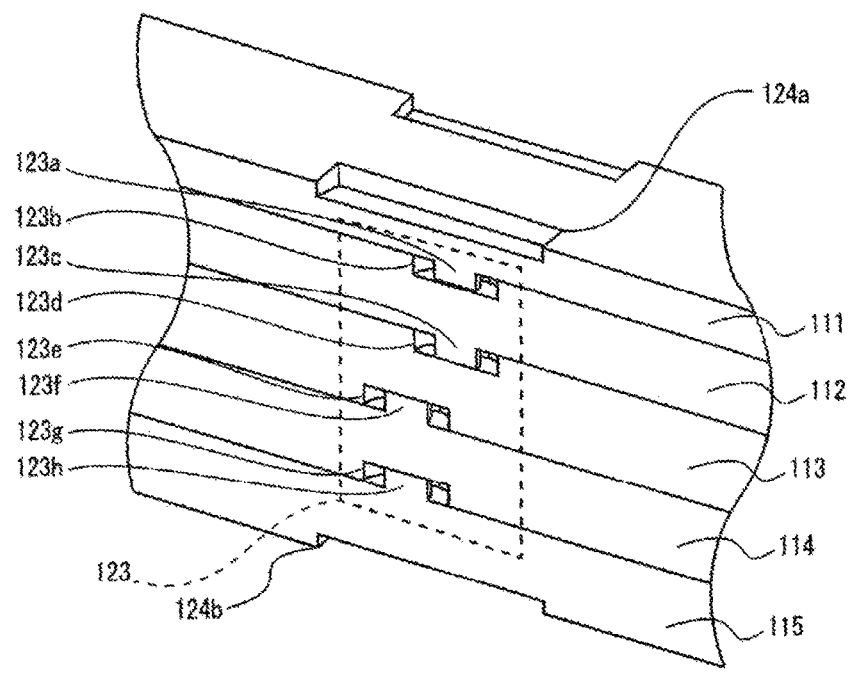
FIG. 12 is an enlarged view for explaining the stacked state of the lens unit.
Figure 13:
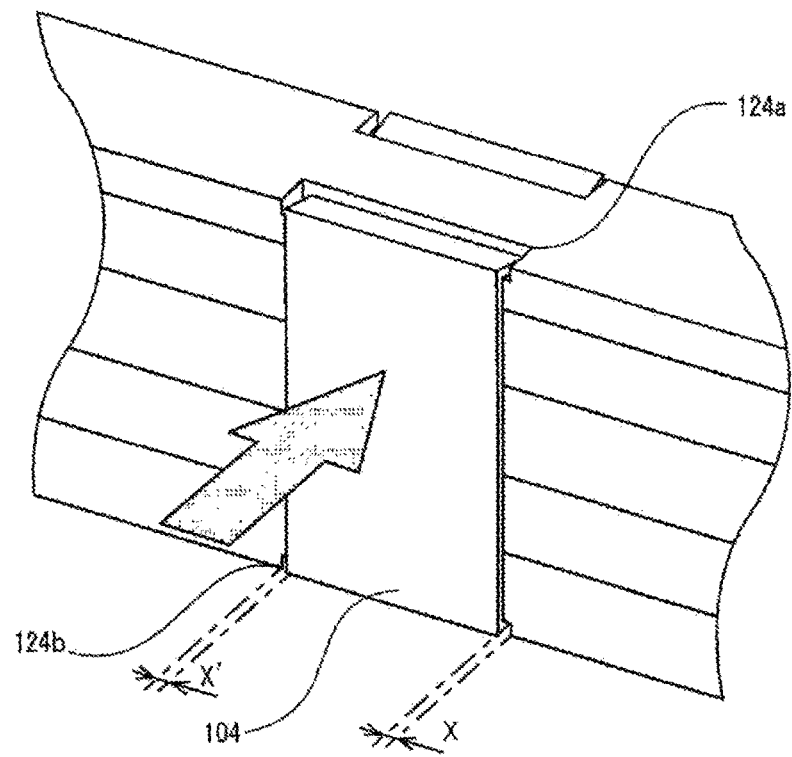
FIG. 13 is an explanatory diagram of a clamp structure of the lens unit.

FIG. 11 is an enlarged view of the stack structure of the lens unit, illustrating region BB other than the longitudinal center portion of lens unit 102 illustrated in FIG. 6. FIG. 12 is an enlarged view of the stacked state of the lens unit, illustrating a state in which the members of the lens unit illustrated in FIG. 11 are stacked. FIG. 13 is an explanatory diagram of a clamp structure of the lens unit.

In this embodiment, at the plural positions (engagement sections) other than the longitudinal center portion of lens unit 102 illustrated in FIG. 6, the members are engaged with one another with the engagement parts rather than being fixed to one another by an adhesive taking into account the fact that expansion and contraction depending on coefficients of linear expansion in the materials of lens cover 111, first lens array 112, partition wall light block plate 113, second lens array 114, and incident light block plate 115 occur depending on temperature and humidity environments around print head 101 (see FIG. 1). Consequently, at the engagement sections other than the longitudinal center portion of lens unit 102, each of the members are positioned with respect to the other members in the widthwise direction and the optical axis direction while each of the members are allowed to slide (expansion and contraction) with respect to the other members in the longitudinal direction of lens unit 102. For example, at the engagement sections other than the longitudinal center portion of lens unit 102, misalignments or movements of each of the members with respect to adjacent members are restricted in the widthwise direction and the optical axis direction and are not restricted in the longitudinal direction of lens unit 102.

As illustrated in FIGS. 11 and 12, at each of such engagement sections, sliding protrusions 123a, 123c, 123f, and 123h functioning as engagement parts and sliding recesses 123b, 123d, 123e, and 123g functioning as engagement parts are formed on the ribs of the members. Sliding recesses 123b, 123d, 123e, and 123g are formed to correspond to sliding protrusions 123a, 123c, 123f, and 123h. In order to enable the members to slide only in the longitudinal direction of lens unit 102 in a state in which sliding protrusions 123a, 123c, 123f, and 123h and sliding recesses 123b, 123d, 123d, and 123g are fit with each other, the dimension in the longitudinal direction of lens unit 102 of sliding recesses 123b, 123d, 123e, and 123g is formed to be longer than the dimension in the longitudinal direction of lens unit 102 of sliding protrusions 123a, 123c, 123f, and 123h by a slidable length.

In this way, in this embodiment, fitting structures 123 are formed by sliding protrusions 123a, 123c, 123f, and 123h and sliding recesses 123b, 123d, 123e, and 123g disposed in the longitudinal direction of lens unit 102. The stacked members of lens unit 102 are engaged with one another to align the optical axes of the lenses.

As illustrated in FIG. 13, clamp members 104 are fit and attached in recess 124a formed at the outer edge portion of lens cover 111 and recess 124b formed at the outer edge portion of incident light block plate 115 to cover fitting structure 123 illustrated in FIG. 12. Clamp members 104 are disposed in positions corresponding to at least one fitting structure 123 in the longitudinal direction of the lens unit (in this embodiment, all fitting structures 123 excluding the longitudinal center portion of the lens unit) to clamp at both widthwise end portions of all the stacked members.

Recesses 124a and 124b, which are provided at portions of lens unit 102 in contact with clamp members 104, are each formed in a taper shape increased in a recess amount toward the widthwise center of lens unit 102 in order to prevent clamp members 104 from coming off.

In the longitudinal direction of lens unit 102, two end portions of clamp members 104 and two end portions of recesses 124a and 124b are formed such that clearances X and X' are provided between the two end portions of clamp members 104 and the two end portions of recesses 124a and 124b. Clamp members 104 are fit in recesses 124a and 124b.

Clamp members 104 and recesses 124a and 124b are formed in this way in order to absorb a displacement amount caused by a difference in a coefficient of linear expansion from holder 103 when lens unit 102 expands and contracts in the longitudinal direction because of temperature and humidity environments around print head 101 (see FIG. 1) in use. This enables the members of lens cover 111, first lens array 112, partition wall light block plate 113, second lens array 114, and incident light block plate 115 to slide between clamp members 104.

Note that clearances X and X' are determined in view of coefficients of linear expansion due to temperature and water absorption of lens cover 111, partition wall light block plate 113, and incident light block plate 115 configuring lens unit 102 and holder 103 illustrated in FIG. 2.

Modification 1

Figure 14:
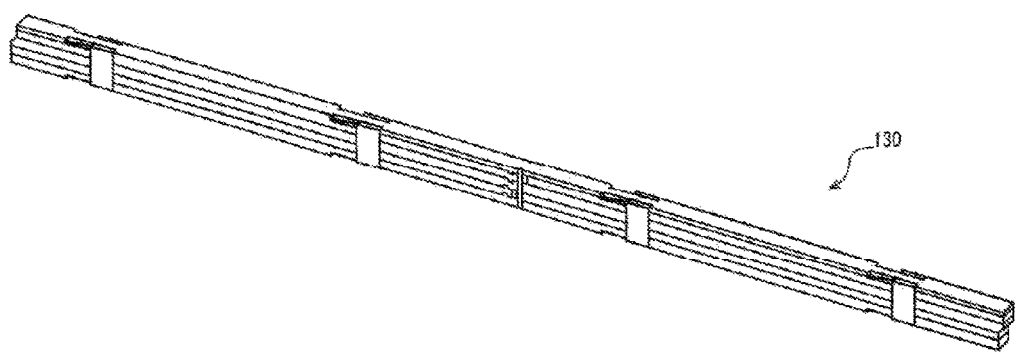
FIG. 14 is a perspective view of a lens unit in a modification 1 of the first embodiment.
Figure 15A:
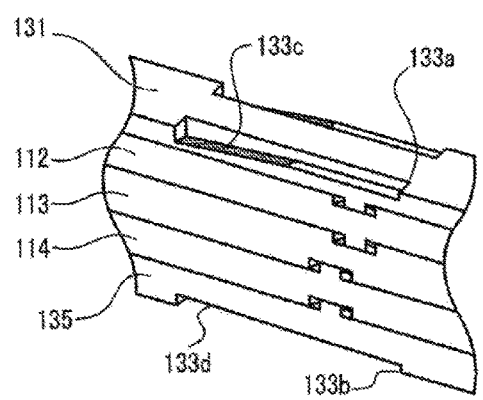
FIGS. 15A to 15C are explanatory diagrams for explaining a clamp structure of the lens unit in the modification 1.
Figure 15B:
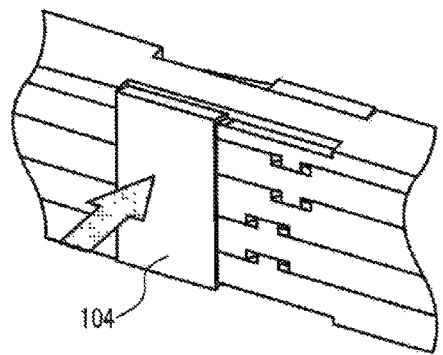
Figure 15C:
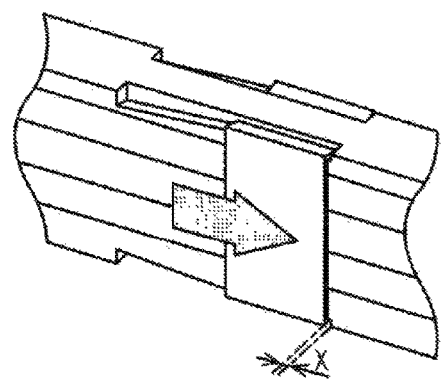

Next, modification 1 of the lens unit is explained. FIG. 14 is a perspective view of a lens unit in the modification1 of the first embodiment. FIGS. 15A to 15C are explanatory diagrams of a clamp structure of the lens unit in the modification 1.

In lens unit 130 in the modification 1 shown in FIGS. 14 to 15C, members of lens cover 131, first lens array 112, partition wall light block plate 113, second lens array 114, and incident light block plate 135 are clamped by clamp members 104.

In the modification 1, the configurations of recess 133a formed at the outer edge portion of lens cover 131 and recess 133b formed at the outer edge portion of incident light block plate 135 are different from recess 124a and recess 124b explained above.

In recess 133a and recess 133b, which are provided at portions in contact with clamp members 104, taper sections 133c and 133d including inclined surfaces (inclined surfaces increased in a recess amount along the longitudinal direction) are formed to extend in the longitudinal direction of lens unit 130. Clamp members 104 are fit in taper sections 133c and 133d when clamp members 104 are attached to lens unit 130.

As illustrated in FIG. 15B, first, clamp members 104 are fit in portions having large recess amounts of recess 133a and recess 133b. As illustrated in FIG. 15C, fit clamp members 104 are slid to portions having small recess amounts of recess 133a and recess 133b in the longitudinal direction to clamp and fix the members of lens cover 131, first lens array 112, partition wall light block plate 113, second lens array 114, and incident light block plate 135.

Note that, in the modification 1, as in the first embodiment, clearance X is provided between end portions (end portions in the longitudinal direction of lens unit 130) of clamp members 104 and end portions (end portions in the longitudinal direction of lens unit 130) of recess 133a and recess 133b.

Modification 2

Figure 16A:
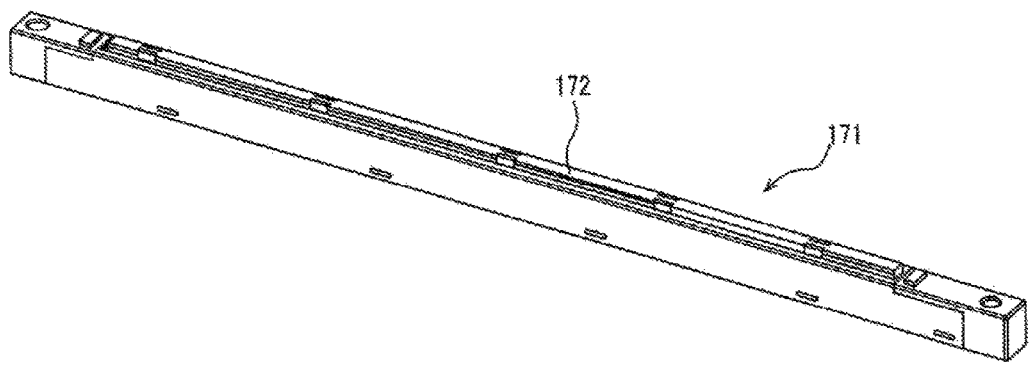
FIGS. 16A and 16B are explanatory diagrams of a print head in a modification 2 of the first embodiment.
Figure 16B:
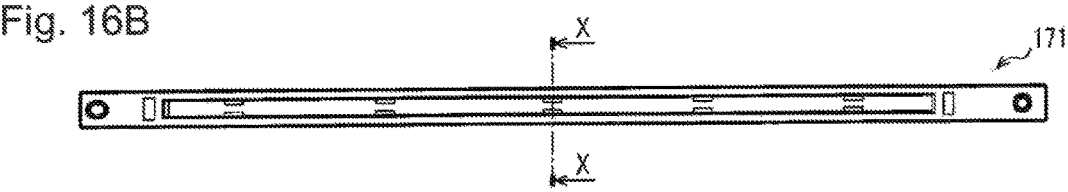
Figure 17:
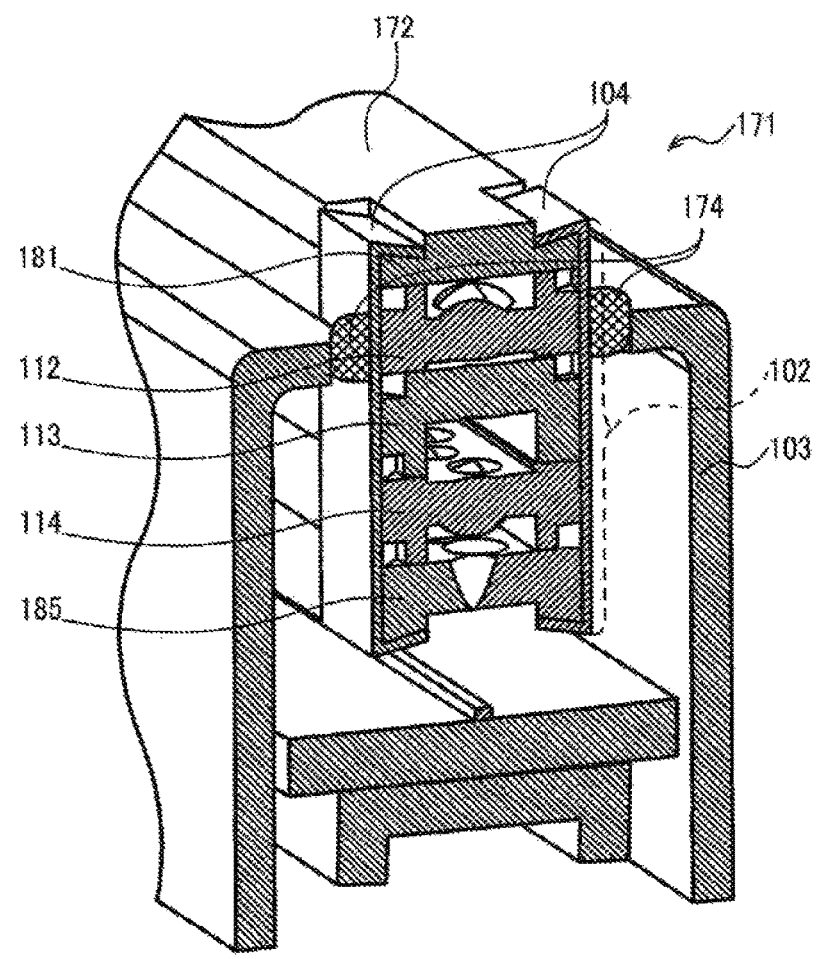
FIG. 17 is a sectional view of the print head in the modification 2.
Figure 18:
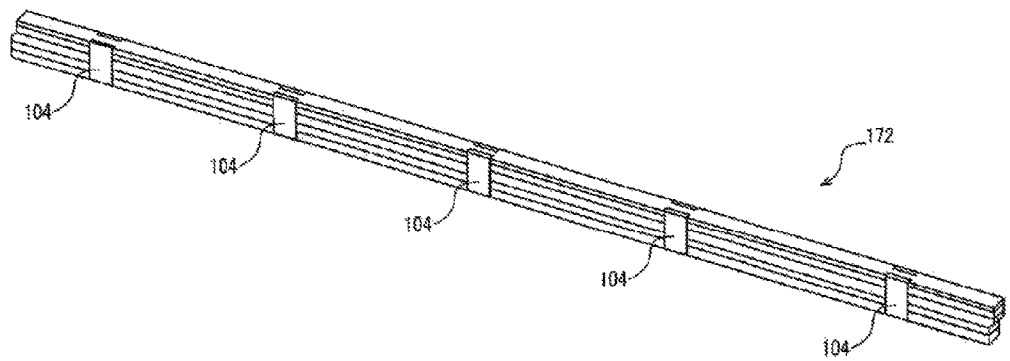
FIG. 18 is a perspective view of a lens unit in the modification 2.
Figure 19A:
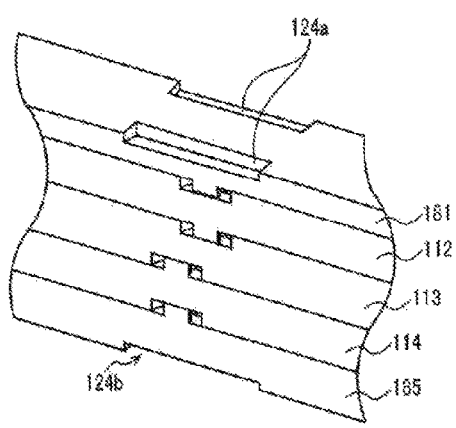
FIGS. 19A and 19B are enlarged views of a stacked state of the lens unit in the modification 2.
Figure 19B:
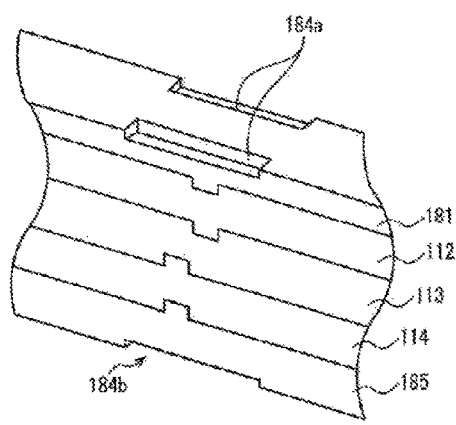

Next, modification 2 of the lens unit is explained. FIGS. 16A and 16B are explanatory diagrams of a print head according to the modification 2 of the first embodiment. FIG. 17 is a sectional view of the print head according to the modification 2. FIG. 18 is a perspective view of the lens unit in the modification 2. FIGS. 19A and 19B are enlarged views of a stacked state of the lens unit according to the modification 2. FIGS. 20A and 20B are explanatory diagrams of a clamp state of the lens unit according to the modification 2.

FIG. 16A is a perspective view of the print head according to the modification 2. FIG. 16B is a plan view of the print head according to the modification 2. FIG. 19A is an enlarged view of a region other than the longitudinal center portion of lens unit 172 illustrated in FIG. 18. FIG. 19B is an enlarged view of a region in the longitudinal center portion of lens unit 172 illustrated in FIG. 18. FIG. 20A is a sectional view of a part other than the longitudinal center portion of lens unit 172 illustrated in FIG. 18. FIG. 20B is a sectional view of the longitudinal center portion of lens unit 172 illustrated in FIG. 18.

As shown in FIGS. 16A and 16B and 17, according to lens unit 172 of the modification 2, stacked members (lens cover 181, first lens array 112, partition wall light block plate 113, second lens array 114, and incident light block plate 185) of the lens unit 172 are clamped to be fixed with each other by clamp members 104 at the longitudinal center portion of lens unit 172.

As illustrated in FIG. 18, the stacked members of lens unit 172 are clamped by clamp members 104 in the engagement section at the other engagement selections other than the longitudinal center portion.

That is, in the modification 2, all the stacked members are fixed with each other at a fixation part in the longitudinal center portion of lens unit 172 (a fixation part in which clamp members 104 are disposed).

In the longitudinal center portion of lens unit 172, the members of lens unit 172 are clamped to be fixed with one another by clamp members 104 as illustrated in FIG. 17. When lens unit 172 is attached to holder 103, lens unit 172 is attached to holder 103 using adhesive 174 via clamp members 104, at the longitudinal center portion of lens unit 172, as in the positions other than the center part.

In the longitudinal center portion of lens unit 172 as illustrated in FIG. 19B, as in the engagement sections illustrated in FIG. 19A other than the longitudinal center portion, recesses 184a and 184b, which are provided at portions in contact with clamp members 104, are formed. Recesses 184a are formed at the outer edge portion of lens cover 181. Recess 184b are formed at the outer edge portion of incident light block plate 185.

Recesses 184a and 184b, which are provided at the portions in contact with clamp members 104, are formed in a taper shape increased in recess amounts in the stacking direction of the members of lens unit 172 toward the widthwise center of lens unit 172 in order to prevent clamp members 104 from coming off.

As illustrated in FIGS. 20A and 20B, a recess amount Δh10 of recess 184a in the engagement section at the longitudinal center portion of lens unit 172 is formed to be smaller than a recess amount Δh11 of recess 124a in the engagement sections other than the longitudinal center portion of lens unit 172. A recess amount Δh20 of recess 184b at the engagement section at the longitudinal center portion of lens unit 172 is formed to be smaller than a recess amount Δh21 of recess 124b in the engagement sections other than the longitudinal center portion of lens unit 172.

This is for the purpose of setting supporting points of the members in lens unit 172 as portions clamped by clamp members 104 in the longitudinal center portion of lens unit 172.

As lens covers 111 and 131, acrylic resin is used. However, polycarbonate and the like can also be used in order to adjust a coefficient of linear explanation to coefficients of linear explanation of the other members.

As first lens array 112 and second lens array 114, cycloolefin polymer resin (product name: ZEONEX (registered trademark) manufactured by ZEON Corporation) is used. Acrylic resin, polycarbonate, or epoxy resin can also be used. However, in a long structure in this embodiment, it may be preferable to use the cycloolefin polymer resin having a small water absorption rate from the viewpoint of dimension stability.

As partition wall light block plate 113 and incident light block plate 115, polycarbonate is used. ABS (acrylonitrile butadiene styrene) resin can be used. However, since it is desirable to set coefficients of linear expansion of lens cover 111, first lens array 112, and second lens array 114 the same as much as possible, it is desirable to use polycarbonate.

As clamp members 104, a stainless steel material for spring is used.

As holder, 103, a sheet metal is used. However, LCP (liquid crystal polymer) resin and aluminum die-cast can also be used.

Printed wiring board 116 is obtained by patterning a copper foil using a glass cloth epoxy resin substrate as a core material.

Semiconductor light emitting elements 117 is obtained by substantially linearly arraying, for example, at 600 dpi (dots per inch) or 1200 dpi, light emitting diode elements containing GaAs (gallium arsenic) as a main material. Semiconductor light emitting elements 117 can also be an element in which a driving circuit is integrally molded.

As base clamp member 119, polycarbonate is used. However, nylon and the like can also be used.

Adhesives 105, 106, and 107 are UV (Ultra Violet) curing resin containing acrylic resin as a main component. A contact image sensor head (hereinafter referred to as "image sensor head") included in an image scanner functioning as an image scanner apparatus is explained. Note that the configuration of the image scanner is explained below.

Figure 21A:
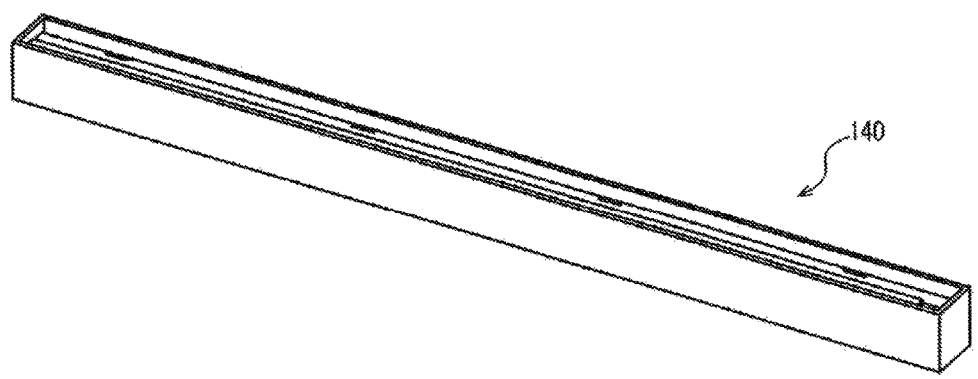
FIGS. 21A and 21B are explanatory diagrams of an image sensor head in the first embodiment.
Figure 21B:
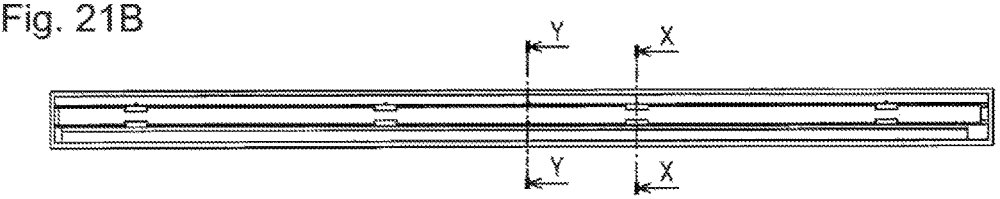
Figure 22:
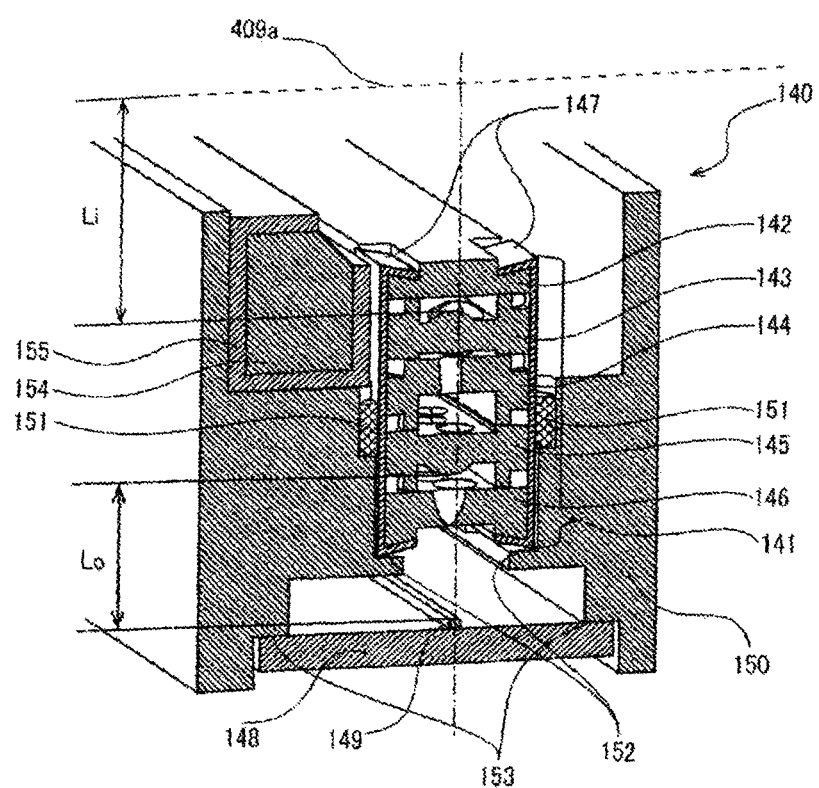
FIG. 22 is a sectional view of the image sensor head.
Figure 23:
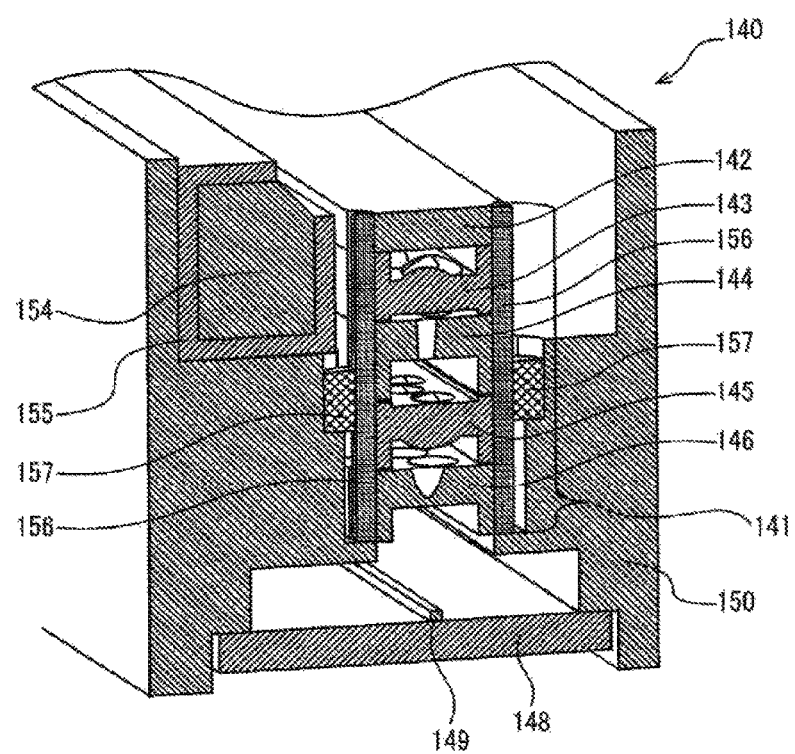
FIG. 23 is a sectional view of the image sensor head.

FIGS. 21A and 21B are explanatory diagrams of the image sensor head in the first embodiment. FIG. 21A is a perspective view of the image sensor head. FIG. 21B is a plan view of the image sensor head. FIG. 22 is a sectional view of the image sensor head taken along the X-X line in FIGS. 21B. FIG. 23 is a sectional view of the image sensor head taken along the Y-Y line in FIG. 21B.

Image sensor head 140 according to this embodiment is explained with reference to FIGS. 21A to 23. As illustrated in FIG. 22, in image sensor head 140, at the attachment parts of lens unit 141 to holder 150 other than the longitudinal center portion of lens unit 141, lens unit 141 is attached (bonded) to holder 150 with adhesive 151 filled between clamp members 147 of lens unit 141 and holder 150.

As in lens unit 102 used in print head 101 illustrated in FIG. 2, pairs of clamp members 147 clamp lens cover 142, first lens array 143, partition wall light block plate 144, second lens array 145, and incident light block plate 146.

The attachment positions of lens unit 141 to holder 150 are determined when receiving section 152 of lens unit 141 in holder 150 and a rib lower surface of incident light block plate 146 of lens unit 141 come into contact with each other such that distance Lo between the surface of semiconductor light receiving element 149 linearly arrayed on printed wiring board 148 and a lower surface extreme point of second lens array 145 in lens unit 141 is an optical designed distance.

Printed wiring board 148 mounted with semiconductor light receiving element 149 is positioned by coming into contact with substrate contract section 153 provided in holder 150. As a method of attaching printed wiring board 148 to holder 150, printed wiring board 148 is attached to holder 150 using an adhesive or printed wiring board 148 is held between holder 150 and a base clamp member using the base clamp member as in the print head 101 illustrated in FIG. 2.

Light guide body 154 for propagating light irradiated from a light source of image sensor head 140 on scanned document surface 409a is fixed to holder 150 to be set beside the widthwise direction of lens unit 141. Light blocking cover 155 is provided to prevent a light leak from a part other than a light irradiation surface of light guide body 154.

An attaching position of image sensor head 140 is adjusted such that distance Li between an upper extreme point of first lens array 143 of lens unit 141 and scanned document surface 409a is an optical designed distance.

As illustrated in FIG. 23, at the attachment part of lens unit 140 to the holder 150 at the longitudinal center portion, the stacked members (bonding lens cover 142, first lens array 143, partition wall light block plate 144, second lens array 145, and incident light block plate 146) of the lens unit are bonded with one another with adhesive 156, and adhesive 157 is bonded to the adhesive 156 or is bonded directly to at least one of the stacked members (lens cover 142, first lens array 143, partition wall light block plate 144, second lens array 145, and incident light block plate 146), so that lens unit 141 is fixed (attached) to holder 150 with adhesive 157.

The stacked members (lens cover 142, first lens array 143, partition wall light block plate 144, second lens array 145, and incident light block plate 146) of the lens unit are the same as lens cover 111, first lens array 112, partition wall light block plate 113, second lens array 114, and incident light block plate 115 (see FIG. 2) of lens unit 102 used in the printer head explained above.

Holder 150 is polycarbonate resin. However, holder 150 can also be ABS resin and LCP resin.

Adhesives 151, 156, and 157 are UV curing resin containing acrylic resin as a main component. Printed wiring board 148 is obtained by patterning a copper foil using a glass cloth epoxy resin substrate as a core material.

Semiconductor light receiving element 149 is obtained by substantially linearly arraying, for example, at 600 dpi, 1200 dpi, or 2400 dpi, CMOS sensors or CCD sensors manufactured on an Si substrate.

As light guide body 154, acrylic resin is used. Light blocking cover 155 of light guide body 154 can be molded resin having high universality.

Next, operations of the configuration explained above is explained. Operations of lens unit 102 illustrated in FIGS. 2 to 13 used in print head 101 illustrated in FIGS. 1A to 1D, operations of lens unit 130 illustrated in FIGS. 14 to 15C, and operations of lens unit 141 illustrated in FIGS. 22 and 23 used in image sensor head 140 illustrated in FIGS. 21A and 21 B will be explained with reference to FIGS. 1A to 23.

Lens units 102, 130, and 141 have a configuration in which members of a resin plate such as lens covers 111, 131, and 142, first lens arrays 112 and 143, partition wall light block plates 113 and 144, second lens arrays 114 and 145, and incident light block plates 115, 135, 146 are stacked. Therefore, when coefficients of linear expansion due to heat or water absorption of the members are different, expansion and contraction of the members involved in the respective coefficients of linear expansion occur.

In that case, if the members are bonded to one another using an adhesive at two or more positions in the longitudinal direction of the members, lens units 102, 130, and 141 as a whole may warp in a lens optical axis direction because of the members may expand and contract corresponding to their coefficients of linear expansion.

On the other hand, in lens units 102, 130, and 141 in this embodiment, the stacked members are mutually bonded with adhesives 106 and 156 at only one place in the longitudinal direction, which is the longitudinal center portion. Engagement sections other than the longitudinal center portion are clamped by by clamp members 104 and 147 to held all the stacked member from both sides in the optical axis direction.

In this way, in the engagement sections other than the longitudinal center portion, the stacked members are not bonded to one another. Therefore, each of the stacked members can slide with respect to the other stacked members in the longitudinal direction, at the positions other than the longitudinal center portion.

In this embodiment, when the members slide, the members restrict one another in the widthwise direction and the lens optical axis direction with sliding protrusions 123a, 123c, 123f, and 123h and sliding recesses 123b, 123d, 123e, and 123g provided in the members. Therefore, deviation of optical design is limited only in the longitudinal direction.

Further in this embodiment, at only the longitudinal center portion of lens units 102, 130, and 141, the stacked members are fixed (bonded) to one another by adhesives 106 and 156. Therefore, it is possible to match action points due to expansion and contraction of the members in the longitudinal direction.

In print head 101 including lens units 102 and 130 explained above, lens units 102 and 130 and holder 103 are attached to holder 103 by adhesive 105 via clamp members 104 in the engagement sections other than the longitudinal center portion of lens units 102 and 130.

Therefore, even when there is a difference between a coefficient of linear expansion of lens units 102 and 130 and a coefficient of linear expansion of holder 103, it is possible to absorb the difference between expansion and contraction amounts of lens units 102 and 130 and holder 103 by sliding lens units 102 and 130 in the longitudinal direction in clamp members 104.

At the longitudinal center portion of lens units 102 and 130, at least one of lens covers 111 and 131, first lens array 112, partition wall light block plate 113, second lens array 114, incident light block plates 115 and 135, and adhesive 106 of lens units 102 and 130 is directly attached (bonded) to holder 103 using adhesive 107.

Therefore, even when expansion and contraction occur in the longitudinal direction of lens units 102 and 130, an action point of the expansion and contraction can always be set in the longitudinal center portion of a light emitting region of print head 101.

In lens unit 130, which is the modification 1 of lens unit 102, compared with lens unit 102, when clamp members 104 are attached, it is possible to prevent damage to the widthwise end portions extending in the longitudinal direction of lens cover 131 and incident light block plate 135 due to contact with clamp members 104 and occurrence of dust due to the damage.

Further, in lens unit 172, which is the modification 2 of lens unit 102, since the stacked members are fixed with each other using clamp members 104 at the longitudinal center portion of lens unit 172 as in the engagement sections other than the longitudinal center portion, it is possible to easily perform disassembly and reassembly of lens unit 172 by detaching clamp members 104.

In the modification 2, the recess amount of recesses 184a and 184b formed in lens cover 181 and incident light block plate 185 in the longitudinal center portion of lens unit 172 are formed smaller (shallower) than the recess amount of recesses 124a and 124b in the part other than the center part. Therefore, it is possible to set a clamp force by clamp members 104 in the longitudinal center portion of lens unit 172 higher than a clamp force in the part other than the center part. It is possible to set the longitudinal center portion of lens unit 172 as a support point of lens unit 172.

In image sensor head 140 illustrated in FIGS. 21A and 21B including lens unit 141 illustrated in FIGS. 22 and 23, as in print head 101 explained above, lens unit 141 is attached to holder 150 by adhesive 151 via clamp members 147 at the positions other than the longitudinal center portion of lens unit 141.

Therefore, even when there is a difference between a coefficient of linear expansion of lens unit 141 and a coefficient of linear expansion of holder 150, it is possible to absorb the difference between expansion and contraction amounts of lens unit 141 and holder 150 by sliding lens unit 141 in the longitudinal direction in clamp members 147.

At the longitudinal center portion of lens unit 141, adhesive 157 is directly attached to at least one of lens cover 142, first lens array 143, partition wall light block plate 144, second lens array 145, incident light block plate 146, and adhesive 156 of lens unit 141, so that lens unit 141 is attached to holder 150 using adhesive 157.

Therefore, even when expansion and contraction occur in the longitudinal direction of lens unit 141, an action point of the expansion and contraction can always be set in the longitudinal center portion of an imaging region of image sensor head 140.

In this way, in this embodiment, even when an expansion and contraction difference occurs between the constituent members of the lens unit due to ambient temperature and humidity fluctuation, after suppressing warp in the lens optical axis direction of the lens unit, it is possible to maintain design positions of the lens unit in the lens optical axis direction and a direction orthogonal to the lens array direction.

When the lens unit is fixed to the holder, the adhesive is filled between the clamp members of the lens unit and the holder. Therefore, when expansion and contraction of the lens unit occur, it is possible to slide the lens unit in the clamp members. Therefore, it is possible to suppress a break between the lens unit and the holder and warp of the lens unit in the lens optical axis direction.

Therefore, even when there is ambient temperature and humidity fluctuation, it is possible to use the lens unit without deteriorating printing quality and scanning accuracy.

Next, an example is explained in which print head 101 illustrated in FIGS. 1A and 1B is applied to a printer as an image forming apparatus.

Figure 24:
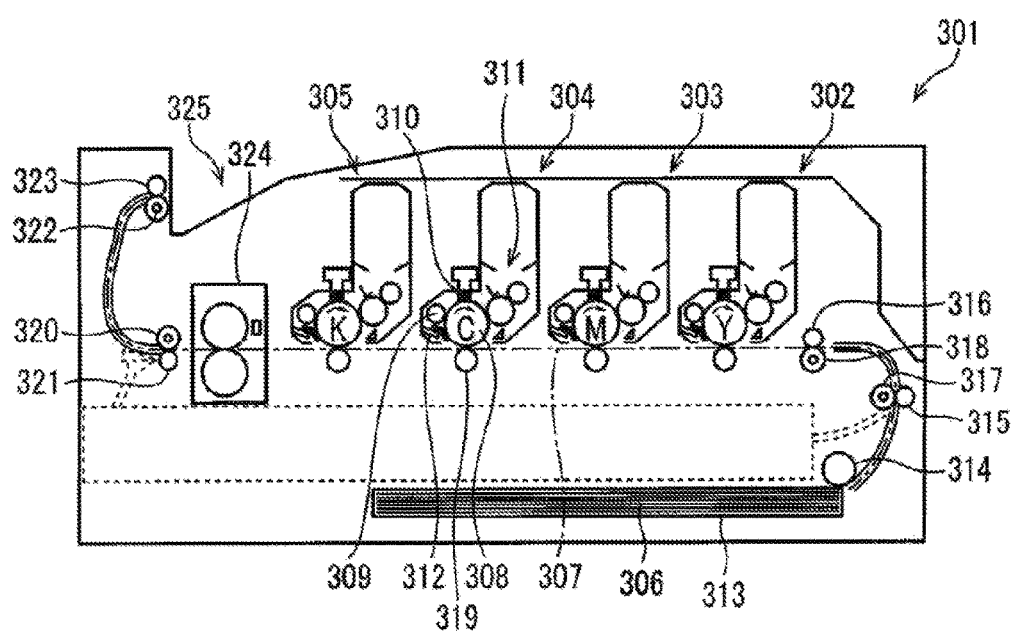
FIG. 24 is a schematic side sectional view illustrating the configuration of a printer according to one or more embodiments.

FIG. 24 is a schematic side sectional view illustrating the configuration of the printer. In FIG. 24, printer 301 as an image forming apparatus is an LED (Light Emitting Diode) printer mounted with print head 101 illustrated in FIG. 1.

Printer 301 includes four process units 302, 303, 304, and 305 that form images of respective colors of yellow (Y), magenta (M), cyan (C), and black (K) using an electrophotographic system.

Process units 302, 303, 304, and 305 are disposed in the order of process unit 302(Y), process unit 303(M), process unit 304(C), and process unit 305(K) along conveyance route 307 of recording media 306.

Process units 302, 303, 304, and 305 include photosensitive drums 308 functioning as image bearing bodies, charging devices 309 that are disposed around photosensitive drums 308 and charge the surfaces of photosensitive drums 308, and exposing devices 310 that selectively irradiate lights on the charged surfaces of photosensitive drums 308 and form electrostatic latent images. In exposing devices 310, print head 101 illustrated in FIGS. 1A and 1B is used as a light source.

Process units 302, 303, 304, and 305 include developing devices 311 that convey toners functioning as developers to the surfaces of photosensitive drums 308 on which the electrostatic latent images are formed and form toner images and cleaning devices 312 that remove the toners remaining on the surfaces of photosensitive drums 308.

Note that photosensitive drums 308 rotate in a direction indicated by an arrow in the figure by a driving source such as a motor and a driving mechanism such as a gear.

Printer 301 includes sheet cassette 313 that stores recording media 306 such as paper and hopping roller 314 that separates recording media 306 stored in sheet cassette 313 one by one and conveys recording media 306.

Downstream of hopping roller 314 in a conveying direction of recording media 306, pinch rollers 315 and 316 and registration rollers 317 and 318 that pinch recording media 306, correct skew feeding of recording media 306 in conjunction with pinch rollers 315 and 316, and convey recording media 306 to process units 302, 303, 304, and 305 are disposed. Note that hopping roller 314 and registration rollers 317 and 318 are connected to the driving source such as the motor and rotate in association with one another.

Printer 301 includes transfer rollers 319 disposed to be opposed to photosensitive drums 308. Transfer rollers 319 are configured by semi-conductive rubber or the like. Potential of photosensitive drums 308 and potential of transfer rollers 319 are set to transfer the toner images on photosensitive drums 308 onto recording media 306.

Printer 301 includes fixation device 324 that fixes the toner images transferred onto recording media 306 with heat and pressure and discharge rollers 320, 321, 322, and 323 that discharge recording media 306, on which the toner images are fixed, to a stacker 325 on the outside of the apparatus.

Recording media 306 stacked on sheet cassette 313 are separated one by one and conveyed by hopping roller 314. Recording media 306 pass registration rollers 317 and 318 and pinch rollers 315 and 316 and pass process units 302, 303, 304, and 305 in this order. In process units 302, 303, 304, and 305, recording media 306 pass between photosensitive drums 308 and transfer rollers 319, the toner images of the respective colors are transferred onto recording media 306 in order, recording media 306 are heated and pressurized by fixation device 324, and the toner images of the respective colors are fixed on the recording media 306. Thereafter, recording media 306 are discharged to stacker 325 by discharge rollers 320, 321, 322, and 323.

Next, an example is explained in which image sensor head 140 illustrated in FIGS. 21A and 21B is applied to an image scanner functioning as an image scanner apparatus.

Figure 25:
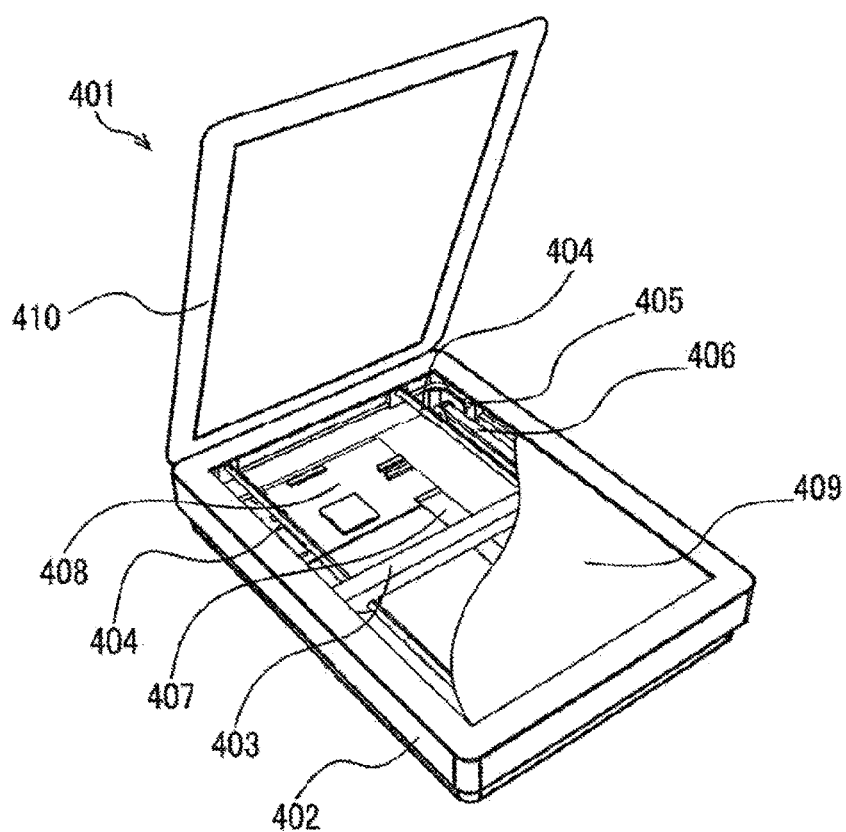
FIG. 25 is a perspective view illustrating the configuration of an image scanner according to one or more embodiments.

FIG. 25 is a perspective view illustrating the configuration of the image scanner. In FIG. 25, image scanner 401 includes housing 402, platen 409 that is provided on the upper surface of housing 402 and on which an original document to be scanned is placed, and lid 410 for holding the original document between lid 410 and platen 409.

On the inside of housing 402, contact image sensor head 403 including image sensor head 140 illustrated in FIGS.

21A and 21B is disposed. Contact image sensor head 403 is supported by and attached to two guides 404 fixed to housing 402.

In order to slide contact image sensor head 403 in a sub-scanning direction along guide 404, contact image sensor head 403 is coupled to driving belt 406 coupled to stepping motor 405.

Control circuit 408 that controls contact image sensor head 403 is connected to contact image sensor head 403 via flexible flat cable 407.

As explained above, in the first embodiment, the lens unit is attached to the holder by the adhesive via the clamp members in positions other than the longitudinal center portion of the lens unit. Therefore, it is possible to suppress warp in the lens optical axis direction of the lens unit due to the influence of expansion and contraction displacement depending on a coefficient of linear expansion difference between the constituent members of the lens unit caused by an ambient temperature or humidity environment.

At least a part of the lens unit is attached to the holder by the adhesive at the longitudinal center portion of the lens unit. This produces an effect that it is possible to absorb an expansion and contraction displacement amount in the longitudinal direction depending on a difference in coefficient of linear expansion between the constituent members of the lens unit by using the longitudinal center portion of the lens unit as an action point.

Further, when the lens unit in this embodiment is mounted on the print head or the image sensor head, the influence of expansion and contraction displacement depending on a coefficient of linear expansion that occurs between the lens unit and the holder is absorbed by sliding the stacked members of the lens unit in the clamp members. As a result, there is an effect that it is possible to suppress warp in the lens optical axis direction of the lens unit, secure stable optical performance, and suppress the lens unit from being sheared and peeled from the holder.

Therefore, by using the print head including the lens unit in this embodiment in the image forming apparatus, it is possible to secure stable printing quality without being affected by fluctuation in an ambient environment.

By using the image sensor head including the lens unit in this embodiment in the image scanner apparatus, it is possible to secure stable scanning quality without being affected by fluctuation in an ambient environment.

Second Embodiment

A configuration in the second embodiment is different from the configuration in the first embodiment in that a lens adhesive filling section is provided in a region where an adhesive for fixing a lens unit to a holder is applied. The configuration in the second embodiment is explained on the basis of FIGS. 26A to 29.

Figure 26A:
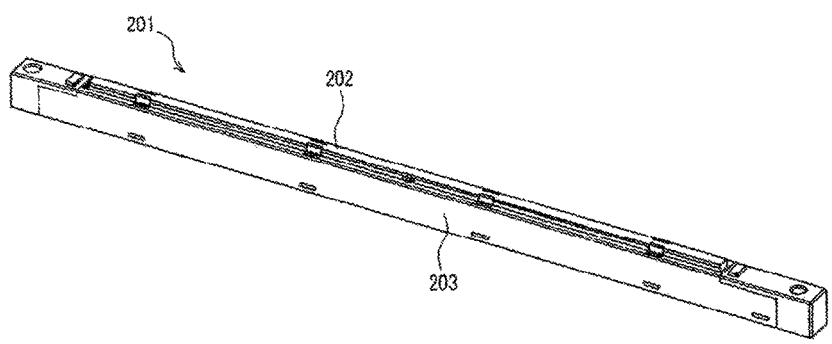
FIGS. 26A to 26D are explanatory diagrams of a print head in a second embodiment.
Figure 26B:
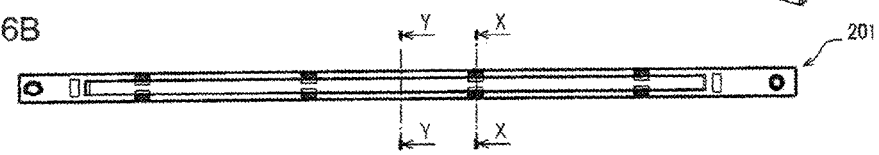
Figure 26C:
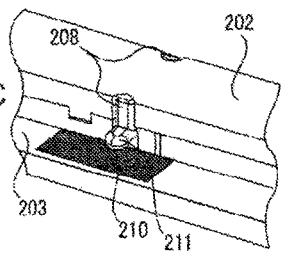
Figure 26D:
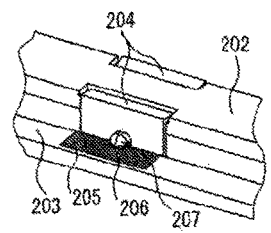

FIGS. 26A to 26D are explanatory diagrams of a print head in the second embodiment. FIG. 26A is a perspective view of the print head. FIG. 26B is a plan view of the print head. FIG. 26C is an enlarged view of an attachment part of the lens unit to the holder at the longitudinal center portion of the print head. FIG. 26D is an enlarged view of attachments parts of the lens unit to the holder at positions other than the longitudinal center portion of the print head.

Figure 27:
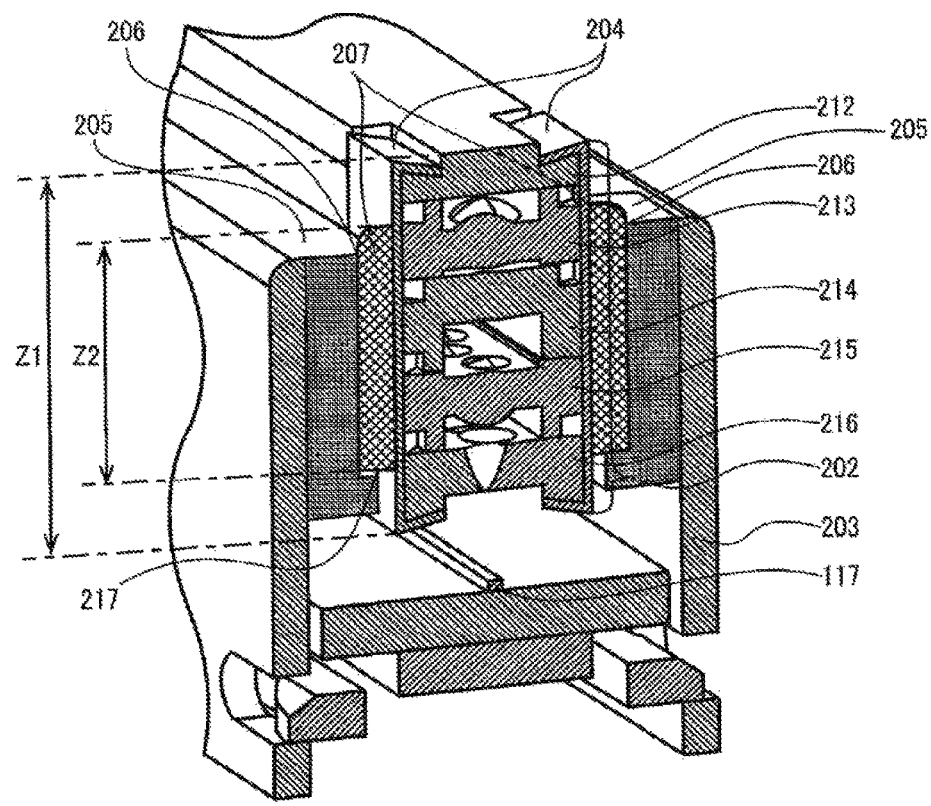
FIG. 27 is a sectional view of the print head.
Figure 28A:
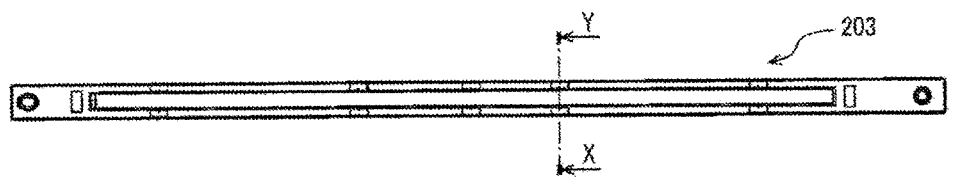
FIGS. 28A and 28B are explanatory diagrams of a holder of the print head.
Figure 28B:
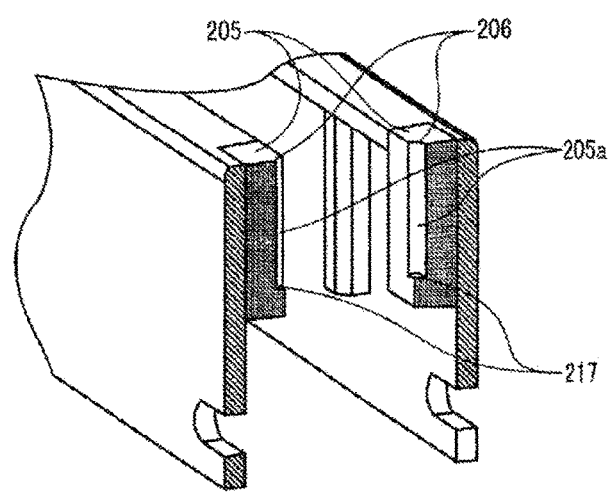
Figure 29:
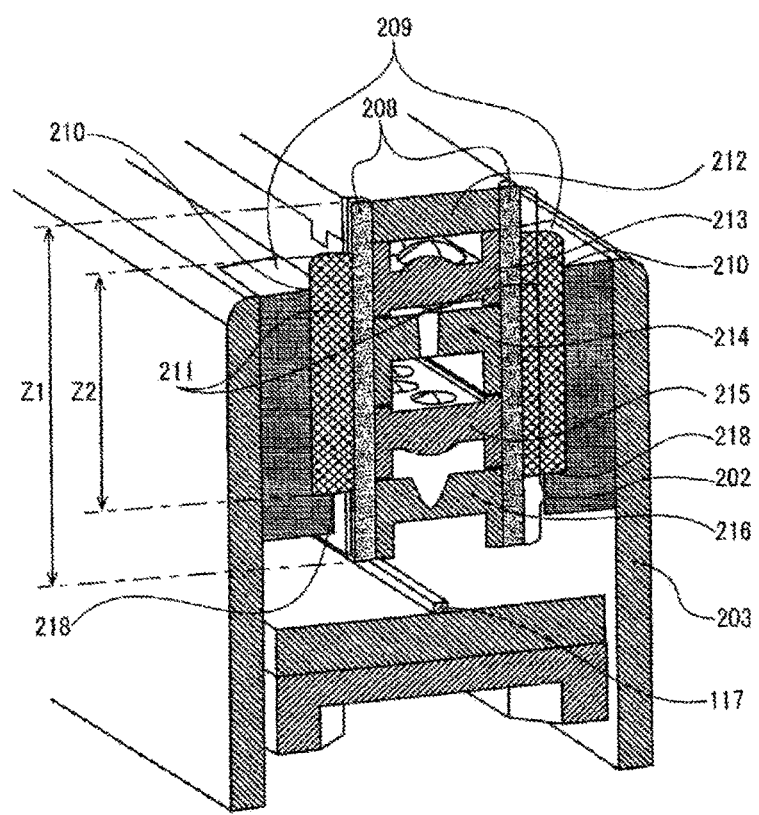
FIG. 29 is a sectional view of the print head.

FIG. 27 is a sectional view of the print head in the second embodiment taken along the X-X line in FIG. 26B. FIGS. 28A and 28B are explanatory diagrams of the holder in the second embodiment. FIG. 28A is a plan view of the holder. FIG. 28B is an sectional view along the X-X line in FIG. 28A. FIG. 29 is a sectional view of the print head taken along the Y-Y line in FIG. 26B. Note that portions same as the portions in the first embodiment explained above are denoted by the same reference numerals and signs and explanation of the portions is omitted.

In print head 201 illustrated in FIGS. 26A and 26B, as in print head 101 illustrated in FIG. 1, in order to clearly illustrate a bonding structure of lens unit 202 and holder 203, illustration of a silicone sealing material between lens unit 202 and holder 203 is omitted.

Print head 201 in this embodiment is explained with reference to FIGS. 26A to 29. In print head 201 in this embodiment, as in the first embodiment, lens unit 202 is attached to holder 203 using adhesives 207 and 211.

In each of the attachment parts of lens unit 202 to holder 203 other than the longitudinal center portion of print head 201 illustrated in FIG. 26D, as illustrated in FIG. 27, the stacked members (lens cover 212, first lens array 213, partition wall light block plate 214, second lens array 215, and incident light block plate 216) of lens unit 202 in the optical axis direction are clamped with pairs of clamp members 204 provided at the widthwise ends of lens unit 102.

In lens unit 202, adhesive 207 is filled in lens adhesive filling section 205 positioned between clamp members 204 and holder 203. Lens unit 202 is thus attached (fixed) to holder 203 with adhesive 207.

On the other hand, as illustrated in FIG. 29, in the attachment part of lens unit 202 to holder 203 at the longitudinal center portion of print head 201 illustrated in FIG. 26C, stacked members (lens cover 212, first lens array 213, partition wall light block plate 214, second lens array 215, and incident light block plate 216) of lens unit 202 are bonded with each other with adhesive 208 filled on both widthwise end portions of lens unit 202, and adhesive 211 is filled formed between lens unit 202 and holder 203 such that adhesive 211 is in direct contact with at least one of lens cover 212, first lens array 213, partition wall light block plate 214, second lens array 215, incident light block plate 216, and adhesive 208. In this way, the lens unit 202 is attached (fixed) to the holder 203.

In lens unit 202 of print head 201 in this embodiment, lens adhesive filling sections 205 and 209 are provided in regions where adhesives 207 and 211 for attaching lens unit 202 to holder 203 are applied.

In lens adhesive filling sections 205 and 209, grooves extending in the lens optical axis direction (the stacking direction of the members of lens unit 202) are formed in order to fill adhesives 207 and 211. For example, as illustrated in FIG. 28B, groove 205a for filling adhesive 207 in lens adhesive filling section 205 is formed to extend in the lens optical axis direction.

In lens adhesive filling sections 205 and 209, filling ports 206 and 210 for filling adhesives 207 and 211 are formed. Filling ports 206 and 210 are formed at end portions of lens adhesive filling sections 205 and 209 on the opposite side of semiconductor light emitting elements 117.

In lens adhesive filling sections 205 and 209, as illustrated in FIGS. 27 and 29, in order to suppress adhesives 207 and 211 from flowing to the lower surface of lens unit 202, adhesive catcher sections 217 and 218 that catches adhesives 207 and 211 filled are formed in positions higher than the lower surface of lens unit 202 (positions on the inner side of an end face of lens unit 202 in the stacking direction of the members).

Adhesive catcher sections 217 and 218 form bottom sections of lens adhesive filling sections 205 and 209.

Adhesive catcher sections 217 and 218 are formed at end portions of lens adhesive filling sections 205 and 209 on the semiconductor light emitting elements 117 side.

Distance (height) Z2 from adhesive catcher sections 217 and 218 of lens adhesive filling sections 205 and 209 to filling ports 206 and 210 is desirably at least a half of length (height) Z1 of lens unit 202 in the lens optical axis direction. This is for the purpose of securing fixed attachment intensity of lens unit 202 and holder 203.

Next, action of the configuration explained above is explained. Note that, in this embodiment, action of the lens adhesive filling sections of the lens unit is explained with reference to FIGS. 26A to 29. Explanation of operations of the lens unit used for the printer head and the lens unit used for the image sensor head explained in the first embodiment is omitted.

In this embodiment, adhesives 207 and 211 are filled from filling ports 206 and 210 of lens adhesive filling sections 205 and 209 illustrated in FIGS. 26A to 29. Adhesives 207 and 211 filled from filling ports 206 and 210 are filled in grooves extending from adhesive catcher sections 217 and 218 to filling ports 206 and 210 and fixedly attach lens unit 202 and holder 203.

As explained above, in lens adhesive filling sections 205 and 209 provided in lens unit 202 and holder 203, adhesives 207 and 211 are widely used in the lens optical axis direction (the height direction) of lens unit 202 to bond lens unit 202 and holder 203. Consequently, it is possible to obtain a rectifying force for stress in a rotating direction around a rotation axis set in the widthwise direction of lens unit 202, the lens optical axis direction or the longitudinal direction.

Adhesive catcher sections 217 and 218 can be provided by forming lens adhesive filling sections 205 and 209 from resin. Therefore, it is possible to accurately bond lens unit 202 and holder 203 with adhesives 207 and 211.

In this embodiment, the adhesive for attaching the lens unit to the holder is provided over a half or more of the length in the lens optical axis direction of the lens unit. Therefore, it is possible to obtain a sufficient rectifying force for rotation stress of the lens unit in a rotating direction around a rotation axis set in the widthwise direction of the lens unit, the lens optical axis direction, or the longitudinal direction. Therefore, it is possible to suppress fluctuation of the lens optical axis and suppress deterioration in printing quality and scanning accuracy depending on assembly accuracy of the lens unit.

As explained above, in the second embodiment, in addition to the effect in the first embodiment, there is an effect that it is possible to obtain a rectifying force for stress in the rotating direction around the rotation axis set in the widthwise direction of the lens unit, the lens optical axis direction, or the longitudinal direction.

There is an effect that it is possible to accurately bond the lens unit and the holder and improve printing quality and scanning quality.

Note that, in the first embodiment and the second embodiment, the image forming apparatus is explained as the printer. However, the image forming apparatus is not limited to the printer and may be a copying machine, a facsimile apparatus, a multifunction peripheral (MFP), and the like.

The image forming apparatus is explained as the printer of a direct transfer type. However, the image forming apparatus is not limited to the printer of the direct transfer type and may be a printer of an intermediate transfer type including an intermediate transfer body, a copying machine, a facsimile apparatus, a multifunction peripheral (MFP), and the like.

Further, the image scanner apparatus is explained as the image scanner. However, the image scanner apparatus is not limited to the image scanner and may be a copying machine, a facsimile apparatus, a multifunction peripheral (MFP), and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A lens unit comprising:
   lens members in each of which one or more lenses are linearly arrayed in a longitudinal direction;
   at least one light block member between the lens members in optical axes of the lenses;
   engagement sections arranged in the longitudinal direction, each of the engagement sections mutually engaging stacked members comprising the lens members and the light block member, the stacked members stacked with each other to align with the optical axes of the lenses; and
   clamp members disposed in positions corresponding to at least one of the engagement sections in the longitudinal direction and clamping the stacked members, wherein
   all of the stacked members are fixed at a single fixation part of the lens unit in the longitudinal direction.

2. The lens unit according to claim 1, wherein the fixation part is positioned in a longitudinal center portion of the lens unit.

3. The lens unit according to claim 2, wherein:
   the fixation part is a bonding part comprising an adhesive that bonds all the stacked members, and
   the clamp members are not positioned in the bonding part.

4. The lens unit according to claim 3, wherein the bonding part comprises recesses formed on widthwise side surfaces of the stacked members, the recesses each extending in a stacking direction of the stacked members and being formed so as to be filled with the adhesive.

5. The lens unit according to claim 2, wherein the clamp members are in positions corresponding to all the engagement sections excluding the longitudinal center portion.

6. The lens unit according to claim 2, wherein the clamp members are positioned in the fixation part.

7. The lens unit according to claim 1, wherein at least one of the engagement sections is formed with the engagement parts at both widthwise ends of the stacked members, the engagement parts restricting misalignments of each of the members with respect to the other members in the widthwise direction and in the optical axis direction of the lenses.

8. The lens unit according to claim 1, wherein one of the engagement sections is provided at or in vicinity of the fixation part and restricts misalignments of each of the members with respect to the other members in the widthwise direction, the optical axis direction, and the longitudinal direction.

9. The lens unit according to claim 1, wherein each of portions of the lens unit in contact with the clamp members comprises a recess having a recess amount that increases toward the widthwise center of the lens unit.

10. The lens unit according to claim 1, wherein each of portions of the lens unit in contact with the clamp members comprises a recess having a recess amount that increases along the longitudinal direction of the members.

11. A lens unit holder that holds the lens unit according to claim 1, the lens unit holder comprising:
a first filling section, wherein an adhesive is filled between the first filling section and the clamp members of the lens unit; and
a second filling section, wherein an adhesive is filled between the second filling section and the fixation part of the lens unit.

12. The lens unit holder according to claim 11, wherein:
each of the first filling section and the second filling section extends in a stacking direction of the stacked members of the lens unit, and
each of the first and second filling sections has a length equal to or greater than a half of a length of the lens unit in the stacking direction of the stacked members.

13. The lens unit holder according to claim 12, wherein:
each of the first and second filling sections comprises an adhesive catcher section catching the filled adhesive, and
the adhesive catcher section is disposed on an inner side of an end face of the lens unit in the stacking direction of the members.

14. A print head comprising the lens unit holder according to claim 11.

15. An image forming apparatus comprising the print head according to claim 14.

16. An image sensor head comprising the lens unit holder according to claim 11.

17. An image scanner apparatus comprising the image sensor head according to claim 16.

* * * * *